US008671186B2

(12) United States Patent
Nagura et al.

(10) Patent No.: US 8,671,186 B2
(45) Date of Patent: Mar. 11, 2014

(54) COMPUTER SYSTEM MANAGEMENT METHOD AND MANAGEMENT APPARATUS

(75) Inventors: Masataka Nagura, Yokohama (JP); Takayuki Nagai, Machida (JP); Kiminori Sugauchi, Yokohama (JP); Yutaka Kudo, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 13/133,899

(22) PCT Filed: Mar. 8, 2011

(86) PCT No.: PCT/JP2011/055315
§ 371 (c)(1),
(2), (4) Date: Jun. 9, 2011

(87) PCT Pub. No.: WO2012/120629
PCT Pub. Date: Sep. 13, 2012

(65) Prior Publication Data
US 2012/0233317 A1 Sep. 13, 2012

(51) Int. Cl.
G06F 15/173 (2006.01)
G06F 15/16 (2006.01)

(52) U.S. Cl.
USPC .......................................... 709/224; 709/249

(58) Field of Classification Search
None
See application file for complete search history.

(56) References Cited

U.S. PATENT DOCUMENTS 6,249,755 B1 * 6/2001 Yemini et al. .................. 702/183
6,678,835 B1 * 1/2004 Shah et al. ..................... 714/4.12
7,069,480 B1 * 6/2006 Lovy et al. ....................... 714/57
7,107,185 B1 9/2006 Yemini et al.
2004/0153533 A1 * 8/2004 Lewis ........................... 709/223
2008/0320495 A1 12/2008 Akiyama et al.
2010/0325493 A1 12/2010 Morimura et al.

FOREIGN PATENT DOCUMENTS

| EP | 2 287 741 A1 | 2/2011 |
| JP | 2000-020428 | 1/2000 |
| JP | 2009-003512 | 1/2009 |
| JP | 2010-086115 A | 4/2010 |
| JP | 2010-182044 | 8/2010 |
| WO | WO 2009/144969 A2 | 12/2009 |

OTHER PUBLICATIONS

PCT International Search Report and Written Opinion on application No. PCT/JP2011/055315 mailed Jun. 28, 2011; 7 pages.

* cited by examiner

*Primary Examiner* — John B. Walsh
(74) *Attorney, Agent, or Firm* — Foley & Lardner LLP

(57) ABSTRACT

The present invention makes it possible to analyze a problem spanning multiple domains. A management apparatus stores an analysis rule. The analysis rule defines a relationship between a causal event, which constitutes a cause of a problem, and multiple relevant events, which denote problems created by the causal event. A first management apparatus acquires a relevant event related to a prescribed node apparatus, which is not under management of the first management apparatus, from a second management apparatus, which manages the prescribed node apparatus. The first management apparatus analyzes a problem by applying the relevant event acquired from the second management apparatus and another relevant event related to a node apparatus under the management of the first management apparatus to the analysis rule.

13 Claims, 41 Drawing Sheets

FIG. 5

Apparatus performance management table T30

| C300 | C301 | C302 | C303 | C304 | C305 | C306 | C307 |
|---|---|---|---|---|---|---|---|
| Apparatus ID | Component ID | Metric | OS | Performance value | Alert threshold | Threshold type | Status |
| SYS1 | CTL1 | Availability ratio | — | 40% | 20% | Upper limit | Abnormal |
| SYS1 | LU1 | IOPS | — | 300 | 1000 | Upper limit | Normal |
| HOST1 | /var | Response time | OS1 | 5msec | 10msec | Upper limit | Normal |
| HOST1 | /opt | Response time | OS1 | 5msec | 10msec | Upper limit | Normal |
| HOST2 | E: | Response time | OS2 | 5msec | 10msec | Upper limit | Normal |
| ... | ... | ... | ... | ... | ... | ... | ... |

FIG. 6

Volume topology management table T31

| Apparatus ID C310 | External management C311 | Volume ID C312 | LU# C313 | Controller name C314 | Coupling-destination host ID C315 | Coupling-destination drive name C316 |
|---|---|---|---|---|---|---|
| SYS1 | NO | VOL1 | LU1 | CTL1 | HOST1 | /var |
| SYS2 | YES | VOL1 | LU1 | CTL1 | HOST1 | /opt |
|  |  | VOL2 | LU2 | CTL2 | HOST2 | E: |
| ... | ... | ... | ... | ... | ... | /... |

FIG. 7

Event management table T32

| Event ID C320 | External server ID C321 | Apparatus ID C322 | Component ID C323 | Metric C324 | OS C325 | Status C326 | Analysis flag C327 | Time C328 |
|---|---|---|---|---|---|---|---|---|
| EV1 | — | SYS1 | CTL1 | Availability ratio | — | Abnormal | NO | 2010-01-01 15:05:00 |
| EV2 | — | SYS1 | CTL3 | Availability ratio | — | Abnormal | NO | 2010-01-01 15:00:00 |
| EV3 | — | SYS1 | LU1 | IOPS | — | Abnormal | NO | 2010-01-01 15:05:00 |
| EV4 | — | SYS1 | LU2 | IOPS | — | Abnormal | NO | 2010-01-01 15:00:00 |
| EV5 | — | SYS1 | LU3 | IOPS | — | Abnormal | NO | 2010-01-01 15:05:00 |
| EV6 | — | HOST1 | /var | Response time | OS1 | Abnormal | NO | 2010-01-01 15:05:00 |
| EV7 | — | HOST1 | /opt | Response time | OS1 | Abnormal | NO | 2010-01-01 15:05:00 |
| EV8 | — | HOST2 | E: | Response time | OS2 | Abnormal | NO | 2010-01-01 15:00:00 |
| EV9 | — | HOST3 | E: | Response time | OS2 | Abnormal | NO | 2010-01-01 15:05:00 |
| EV10 | SV2 | SYS2 | CTL1 | Availability ratio | — | Abnormal | NO | 2010-01-01 15:05:00 |

FIG. 8

| | General rule T33 | | | |
|---|---|---|---|---|
| | C334 | C335 | C336 | C337 |
| | Apparatus type | Component type | Metric | Status |
| Condition part C330 | Host | Drive | Response time | Abnormal |
| | Storage | Controller | Availability ratio | Abnormal |
| | Storage | LU | IOPS | Abnormal |
| Conclusion part C331 | Storage | Controller | Availability ratio | Bottleneck |
| General rule ID C332 | R1 | | | |
| Applicable topology C333 | Volume topology management table | | | |

FIG. 9A

Expansion rule T34

| | | External server ID C344 | Apparatus ID C345 | Component ID C346 | Metric C347 | Status C348 |
|---|---|---|---|---|---|---|
| Condition part C340 | | — | HOST1 | /var | Response time | Abnormal |
| | | — | SYS1 | CTL1 | Availability ratio | Abnormal |
| | | — | SYS1 | LU1 | IOPS | Abnormal |
| Conclusion part C341 | | — | SYS1 | CTL1 | Availability ratio | Bottleneck |
| Expansion rule ID C342 | | ExR1-1 | | | | |
| General rule ID C343 | | R1 | | | | |

FIG. 9B

Expansion rule T34

| | External server ID C344 | Apparatus ID C345 | Component ID C346 | Metric C347 | Status C348 |
|---|---|---|---|---|---|
| Condition part C340 | — | HOST1 | /opt | Response time | Abnormal |
| | SV2 | SYS2 | CTL1 | Availability ratio | Abnormal |
| | SV2 | SYS2 | LU1 | IOPS | Abnormal |
| Conclusion part C341 | SV2 | SYS2 | CTL1 | Availability ratio | Bottleneck |
| Expansion rule ID C342 | ExR1-2 | | | | |
| General rule ID C343 | R1 | | | | |

FIG. 9C

| | | Expansion rule T34 | | | | |
|---|---|---|---|---|---|---|
| | C344 | C345 | C346 | C347 | C348 | |
| | External server ID | Apparatus ID | Component ID | Metric | Status | |
| Condition part C340 | — | HOST2 | E: | Response time | Abnormal | |
| | SV2 | SYS2 | CTL2 | Availability ratio | Abnormal | |
| | SV2 | SYS2 | LU2 | IOPS | Abnormal | |
| Conclusion part C341 | SV2 | SYS2 | CTL2 | Availability ratio | Bottleneck | |
| Expansion rule ID C342 | ExR1-3 | | | | | |
| General rule ID C343 | R1 | | | | | |

FIG. 10

Event transfer reservation management table T35

| Apparatus ID C350 | Component ID C351 | Metric C352 | Status C353 | Transfer-destination management server ID C354 | Time reservation received C355 |
|---|---|---|---|---|---|
| SYS1 | CTL1 | Availability ratio | Abnormal | SV2 | 2010-01-01 15:05:00 |
| SYS1 | LU1 | IOPS | Abnormal | SV2 | 2010-01-01 15:05:00 |

FIG. 11

Analysis result management table T36

| C360 | C361 | C362 | C363 | C364 | C365 | C366 | C367 |
|---|---|---|---|---|---|---|---|
| Cause apparatus ID | Cause component ID | External server ID | Metric | Certainty factor | Expansion rule ID | Received event ID | Time of analysis |
| SYS1 | CTL1 | — | Availability ratio | 3/3 | ExR1-1 | EV1, EV3, EV6 | 2010-01-01 15:10:00 |
| SYS2 | CTL1 | SV2 | Availability ratio | 2/3 | ExR1-2 | EV7, EV10, — | 2010-01-01 15:05:00 |
| ... | ... | ... | ... | ... | ... | ... | ... |

FIG. 14

Event transfer reservation management table T35 (Other domain)

| C350 | C351 | C352 | C353 | C354 | C355 |
|---|---|---|---|---|---|
| Apparatus ID | Component ID | Metric | Status | Transfer-destination management server ID | Time reservation received |
| SYS2 | CTL1 | Availability ratio | Abnormal | SV1 | 2010-01-01 13:00:00 |
| SYS2 | LU1 | IOPS | Abnormal | SV1 | 2010-01-01 13:00:00 |

FIG. 17

Failure analysis result G10

Cause of failure in management domain GP10

| Apparatus ID | Component ID | Metric | Certainty factor | Date/time of analysis |
|---|---|---|---|---|
| SYS1 | CTL1 | Availability ratio | 3/3 | 2010-01-01 15:10:00 |

Cause of failure in other management domain GP11

| Apparatus ID | Component ID | Metric | Certainty factor | Date/time of analysis | Management server |
|---|---|---|---|---|---|
| SYS2 | CTL1 | Availability ratio | 2/3 | 2010-01-01 15:10:00 | SV2 |

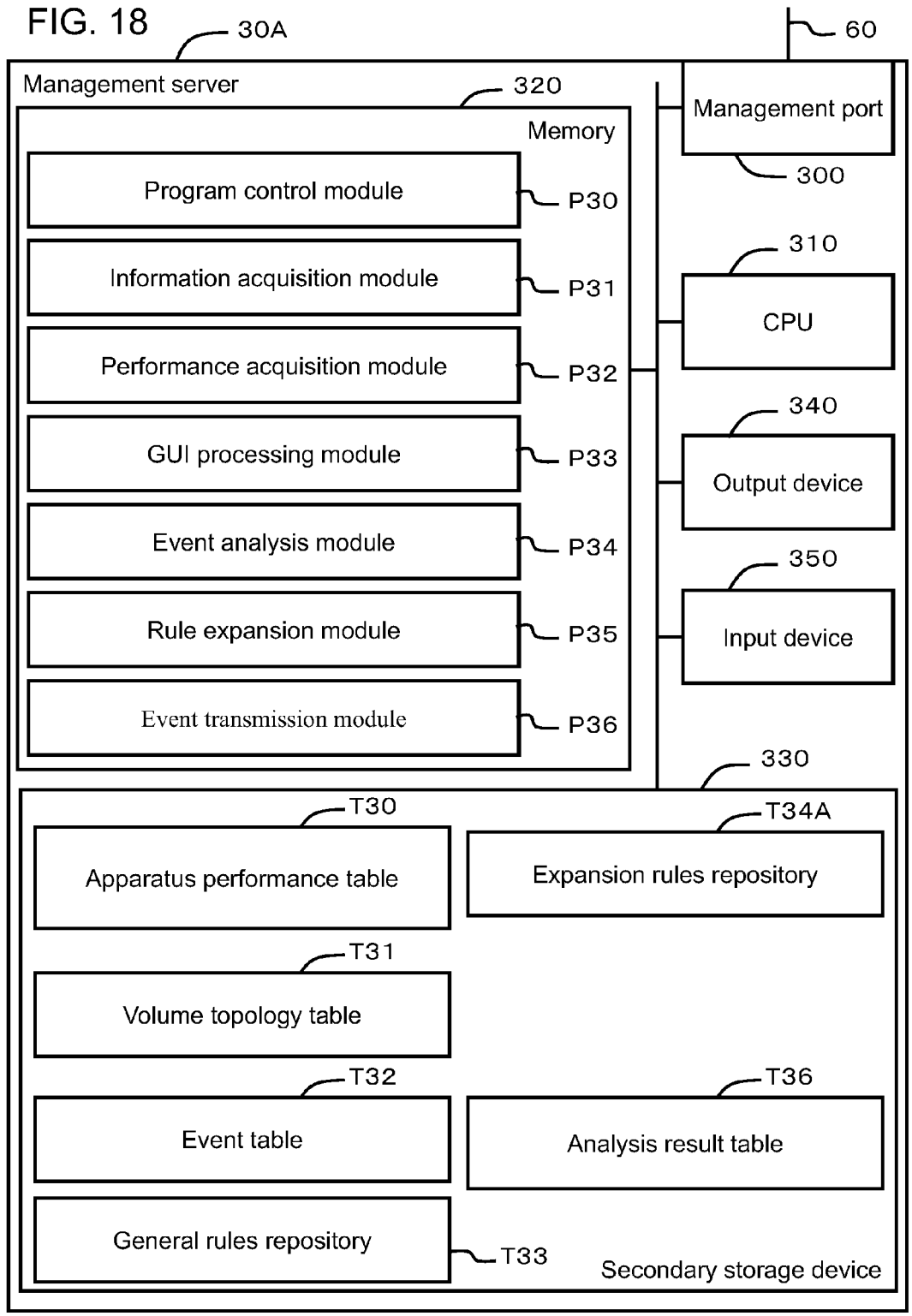

FIG. 19A

| | | Expansion rule T34A | | | | |
|---|---|---|---|---|---|---|
| | External domain C344A | Apparatus ID C345 | Component ID C346 | Metric C347 | Status C348 | |
| Condition part C340 | NO | HOST1 | /var | Response time | Abnormal | |
| | NO | SYS1 | CTL1 | Availability ratio | Abnormal | |
| | NO | SYS1 | LU1 | IOPS | Abnormal | |
| Conclusion part C341 | NO | SYS1 | CTL1 | Availability ratio | Bottleneck | |
| Expansion rule ID C342 | ExR1-1 | | | | | |
| General rule ID C343 | R1 | | | | | |

FIG. 19B

Expansion rule T34A

| | C344A | C345 | C346 | C347 | C348 |
|---|---|---|---|---|---|
| | External domain | Apparatus ID | Component ID | Metric | Status |
| Condition part C340 | NO | HOST1 | /opt | Response time | Abnormal |
| | YES | SYS2 | CTL1 | Availability ratio | Abnormal |
| | YES | SYS2 | LU1 | IOPS | Abnormal |
| Conclusion part C341 | YES | SYS2 | CTL1 | Availability ratio | Bottleneck |
| Expansion rule ID C342 | ExR1-2 | | | | |
| General rule ID C343 | R1 | | | | |

FIG. 19C

| Expansion rule T34A | | | | | | |
|---|---|---|---|---|---|---|
| | C344A | C345 | C346 | C347 | C348 | |
| | External domain | Apparatus ID | Component ID | Metric | Status | |
| Condition part C340 | NO | HOST2 | E: | Response time | Abnormal | |
| | YES | SYS2 | CTL2 | Availability ratio | Abnormal | |
| | YES | SYS2 | LU2 | IOPS | Abnormal | |
| | YES | SYS2 | CTL2 | Availability ratio | Bottleneck | |
| Conclusion part C341 | | | | | | |
| Expansion rule ID C342 | ExR1-3 | | | | | |
| General rule ID C343 | R1 | | | | | |

FIG. 27

| | C500 | C501 | C502 | C503 | C504 | C505 |
|---|---|---|---|---|---|---|
| Analysis result management table T50 | Cause apparatus ID | Cause component ID | Management server ID | Metric | Certainty factor | Time of analysis |
| | SYS1 | CTL1 | — | Availability ratio | 3/3 | 2010-01-01 15:10:00 |
| | SYS2 | CTL1 | SV2 | Availability ratio | 2/3 | 2010-01-01 15:05:00 |
| | ... | ... | ... | ... | ... | ... |

FIG. 28

Failure analysis result G20

Cause of failure GP20

| Apparatus ID | Component ID | Metric | Certainty factor | Date/time of analysis | Management server |
|---|---|---|---|---|---|
| SYS1 | CTL1 | Availability ratio | 3/3 | 2010-01-01 15:10:00 | SV1 |
| SYS2 | CTL1 | Availability ratio | 2/3 | 2010-01-01 15:10:00 | SV2 |

FIG. 30

Query-destination server management table T37

| Management server ID (C370) | Redundancy (C371) | No. of servers in domain (C372) | No. of storages in domain (C373) | No. of switches in domain (C374) | Date/time of last query (C375) |
|---|---|---|---|---|---|
| SV2 | 3 | 100 | 40 | 50 | 2010-01-01 15:10:00 |
| SV3 | 2 | 0 | 30 | 10 | 2009-12-30 19:10:00 |
| ... | ... | ... | ... | ... | ... |

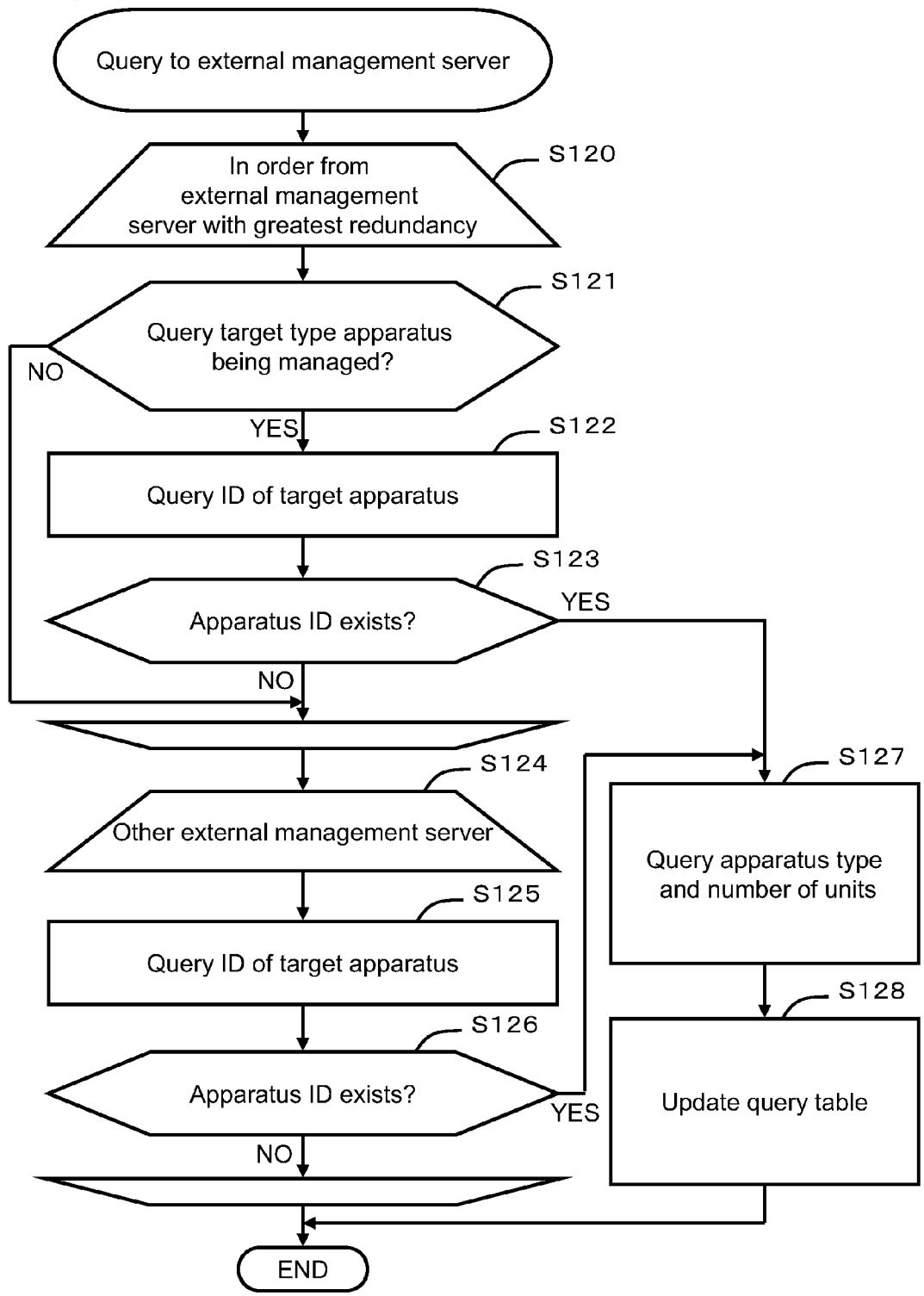

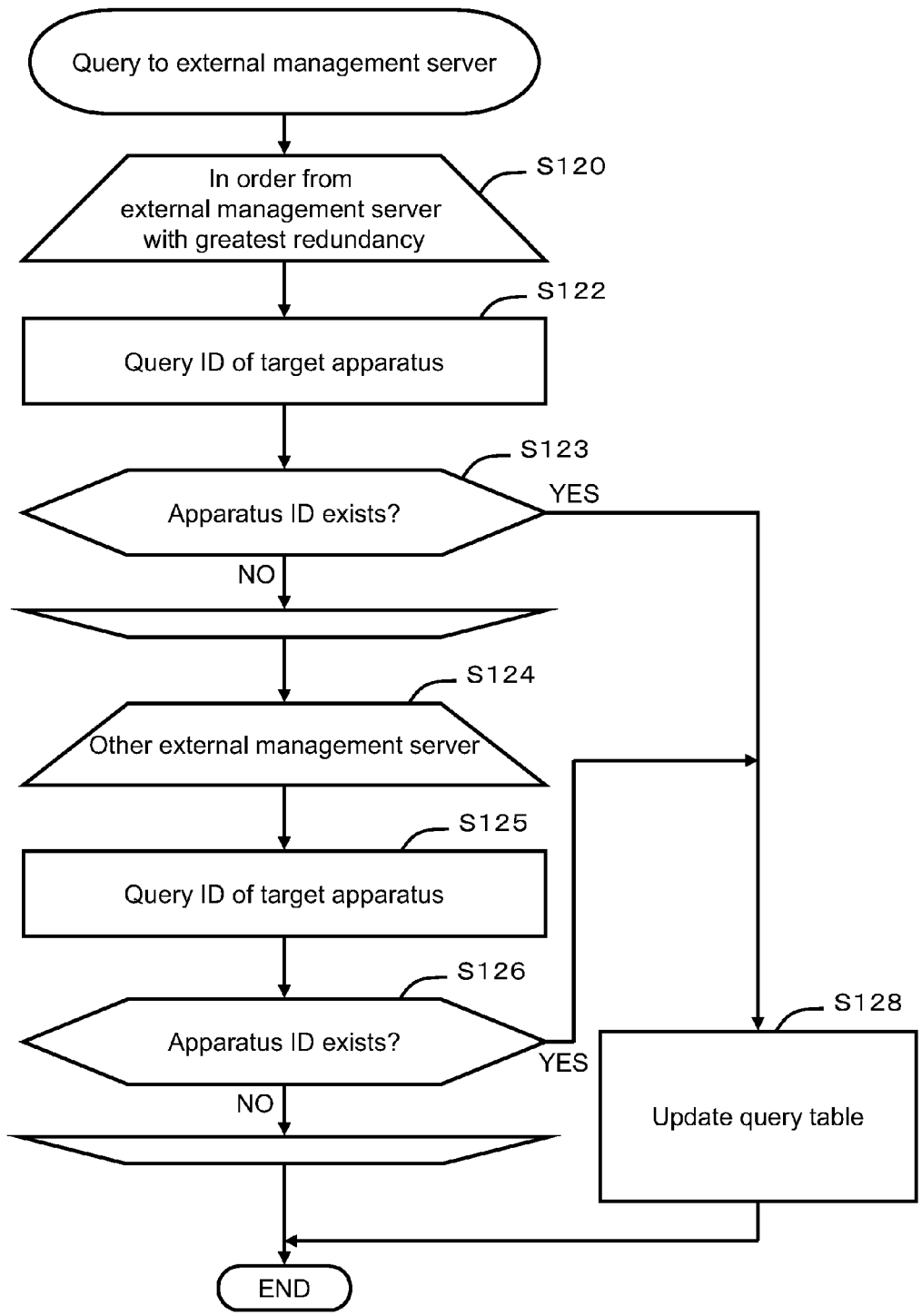

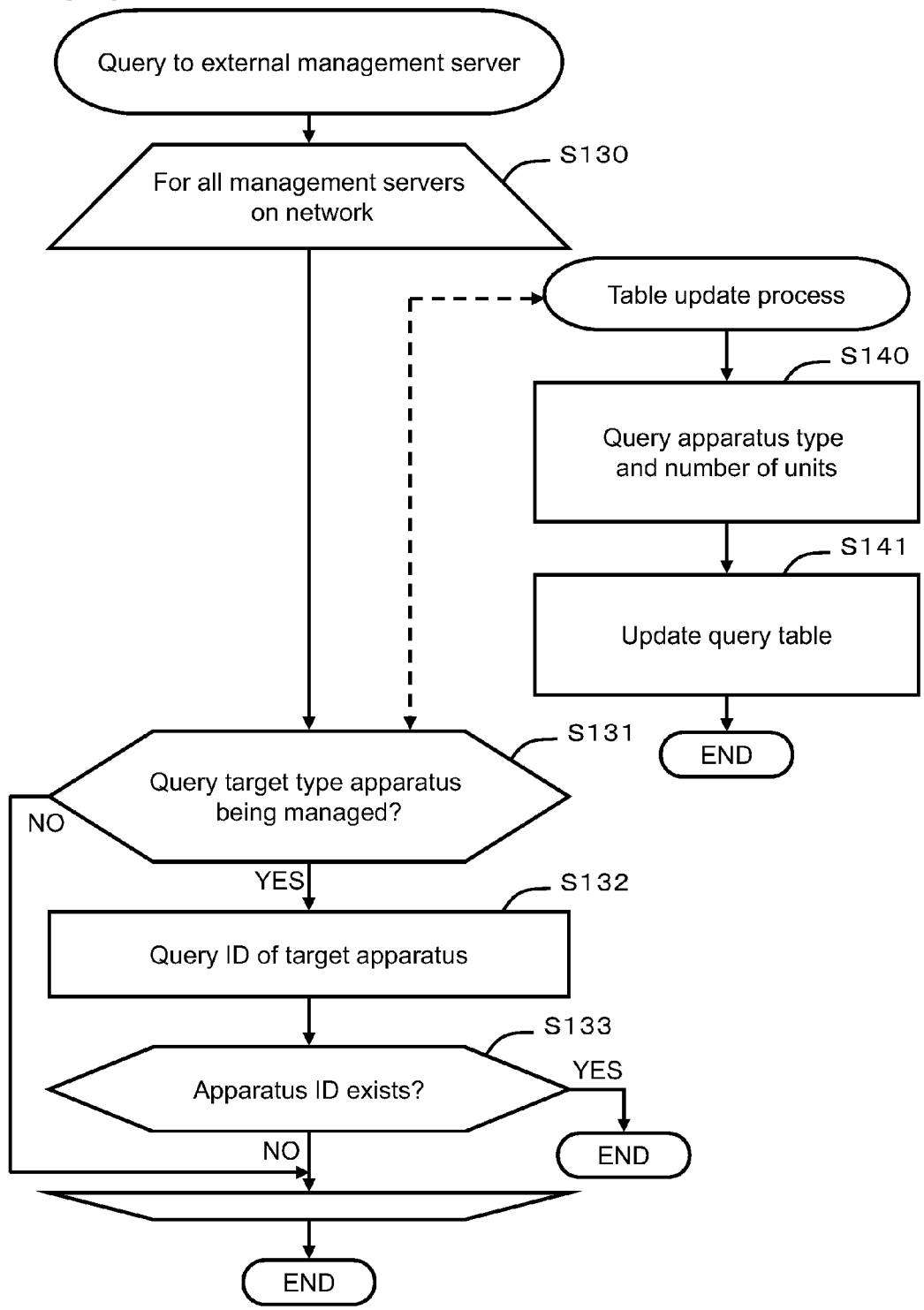

COMPUTER SYSTEM MANAGEMENT METHOD AND MANAGEMENT APPARATUS

TECHNICAL FIELD

The present invention relates to a computer system management method and a computer system management apparatus.

BACKGROUND ART

For example, as shown in Patent Literature 1, an event, which is the cause of a problem, is detected from among multiple problems or the symptoms thereof in a computer system. When the performance value of a management-target apparatus exceeds a threshold, the management software of Patent Literature 1 detects this as an event, and stores this event in an event database.

Furthermore, this management software possesses an analysis engine for analyzing the cause-effect relationship of multiple problem events, which have occurred in the management-target apparatus. The analysis engine accesses a configuration database, which has inventory information with respect to the management-target apparatus, and recognizes the configuration components inside the management-target apparatus, which is on the I/O (Input/Output) path. The analysis engine recognizes the configuration components capable of impacting the performance of the logical volume of a host computer as a single group, called a "topology".

When an event occurs, the analysis engine applies an analysis rule to each topology and constructs an expansion rule in accordance therewith. The analysis rule comprises a predetermined condition statement and analysis result. The expansion rule comprises a causal event in another apparatus that constitutes the cause of a drop in performance, and a group of relevant events caused thereby.

Specifically, an event, which is described as the cause of a problem in the THEN part of the rule is the causal event. An event other than the causal event among the events described in the IF part of the rule is the relevant event.

In Patent Literature 2, in a case where a problem, which has occurred in an apparatus targeted for management by the management server, is the cause of another problem, which has occurred in an apparatus that falls outside management range of this management server, a GUI (Graphical User Interface) display shows that the cause of the problem is an apparatus that is outside the management-target range. In accordance with this, the user (the administrator of the computer system) can learn that a problem, which is the cause of a problem that occurred in an apparatus outside the management range, has occurred.

CITATION LIST

Patent Literature

[PTL 1]
U.S. Pat. No. 7,107,185
[PTL 2]
Japanese Patent Laid-open Application No. 2010-86115

SUMMARY OF INVENTION

Technical Problem

In the first prior art shown in Patent Literature 1, a management server is not able to analyze the cause of a problem unless all the management-target apparatus information has been directly acquired. Therefore, in the case of a large-scale computer system, a single management computer must acquire the information of all the apparatuses. However, performance-wise, it is unreasonable to expect a single management server to analyze the problems of a large-scale computer system.

Accordingly, it is conceivable that the management-targeted computer system could be partitioned and management performed by disposing a management server in each of the partitioned domains. In a case where an event that occurred in one apparatus within the management range becomes the cause that triggers a problem in another apparatus within the management range, the management server in charge of this management range is able to identify the event that is the cause of the problem. This is because the causal event as well as the resultant problem both occur within the management range of the management server.

Alternatively, a case in which an event that has occurred in one apparatus, which is the management target of one management server, triggers a problem in another apparatus, which is the management target of another management server, will be considered. In this case, it is not possible for the respective management servers to associate the one apparatus, which is the cause of the problem, with the other apparatus, in which the problem occurred in accordance therewith, and to analyze the cause. This is because the respective management servers only manage information within their respective management ranges.

In the second prior art shown in Patent Literature 2, each management server is able to show that the cause of a problem exists outside its own management range as an analysis result. However, in the second prior art, it is not possible to show the apparatus and the management server thereof in which the cause of this problem occurred. Therefore, the user must compare the analysis results of all of the management servers and provide an analogy in the form of an IF-THEN format rule in order to identify the cause of the problem.

With the foregoing in mind, an object of the present invention is to provide a computer system management method and management apparatus that make it possible to use multiple management apparatuses to analyze a problem in the computer system.

Solution to Problem

A computer system management method related to a first aspect of the present invention is for managing a computer system, wherein multiple management domains are configured in the computer system, the multiple management domains respectively comprise at least one node apparatus and a management apparatus for managing the node apparatus, the respective management apparatuses store a prescribed analysis rule, the prescribed analysis rule defines a relationship between a causal event, which is a cause of a problem, and multiple relevant events, which denote problems created by the causal event, and a first management apparatus of the respective management apparatuses acquires, from among the respective relevant events, a relevant event related to a prescribed node apparatus, which is not under management of the first management apparatus, from a second management apparatus, which manages the prescribed node apparatus from among the respective management apparatuses, and analyzes a problem by applying the relevant event acquired from the second management apparatus and another relevant event related to a node apparatus under the management of the first management apparatus to the analysis rule.

The first management apparatus may compute a likelihood of the causal event on a basis of the number of the acquired relevant events of the multiple relevant events included in the analysis rule, and may output the likelihood of the causal event as a part of a problem analysis result.

The first management apparatus, in a case where a node apparatus related to the causal event is being managed by the second management apparatus, may associate information denoting the second management apparatus with the causal event, and output this associated information as a part of the problem analysis result.

The first management apparatus may query the second management apparatus as to whether or not the second management apparatus is managing the prescribed node apparatus, and may acquire the relevant event related to the prescribed node apparatus from the second management apparatus in a case where the second management apparatus has responded that the second management apparatus is managing the prescribed node apparatus.

The first management apparatus may also select, from among the respective management apparatuses in order of prescribed priority, a management apparatus for querying as to whether or not this management apparatus is managing the prescribed node apparatus as a query-destination management apparatus. The first management apparatus may acquire from the second management apparatus the relevant event related to the prescribed node apparatus in a case where at least one of the respective relevant events has been detected in a node apparatus under the management of the first management apparatus.

BRIEF DESCRIPTION OF DRAWINGS

FIG. 5 is a diagram of an example of the configuration of an apparatus performance management table.

FIG. 6 is a diagram showing an example of the configuration of a volume topology management table.

FIG. 7 is a diagram showing an example of the configuration of an event management table.

FIG. 8 is a diagram showing an example of the configuration of a general rule.

FIG. 9A is a diagram showing an example of a first configuration of an expansion rule.

FIG. 9B is a diagram showing an example of a second configuration of the expansion rule.

FIG. 9C is a diagram showing an example of a third configuration of the expansion rule.

FIG. 10 is a diagram showing an example of the configuration of an event transfer reservation management table.

FIG. 11 is a diagram showing an example of the configuration of an analysis result management table.

FIG. 14 is a diagram showing an example of the configuration of an event transfer reservation management table of a management server of another domain.

FIG. 17 is a diagram showing an example of the configuration of a problem analysis result screen.

FIG. 18 is a diagram showing an example of the configuration of a management server in a second embodiment.

FIG. 19A is a diagram showing an example of a first configuration of an expansion rule.

FIG. 19B is a diagram showing an example of a second configuration of the expansion rule.

FIG. 19C is a diagram showing an example of a third configuration of the expansion rule.

FIG. 27 is a diagram of an example of the configuration of an analysis result management table.

FIG. 28 is a diagram of an example of the configuration of a problem analysis result display screen.

FIG. 30 is a diagram showing a query-destination server management table.

FIG. 32 is a flowchart showing a process for querying another management server about an apparatus ID.

FIG. 32A is a flowchart showing an example of a first variation of the query process.

FIG. 32B is a flowchart showing an example of a second variation of the query process.

DESCRIPTION OF EMBODIMENT

Figure 1:
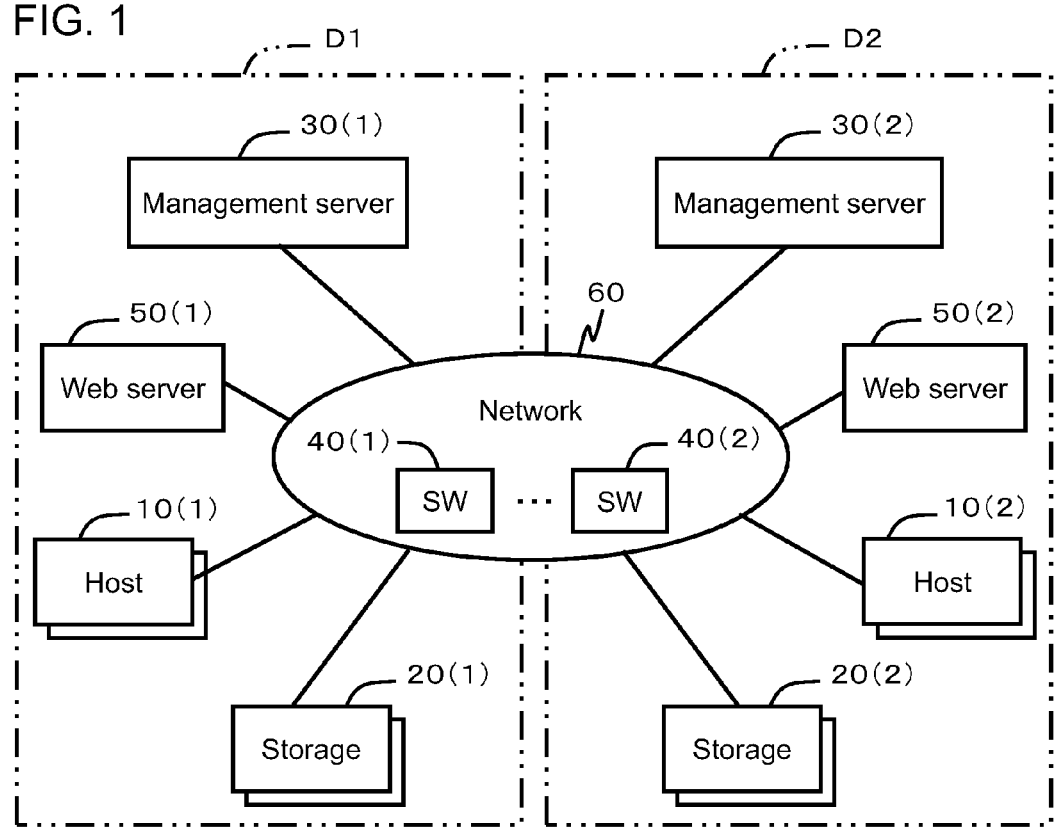
FIG. 1 is a diagram showing an example of the physical configuration of a computer system.

The embodiments of the present invention will be explained below by referring to the attached drawings. However, it should be noted that the embodiments are merely examples for realizing the present invention, and do not limit the technical scope of the present invention.

Furthermore, in this specification, information utilized in the present invention will be explained using the expression "aaa table", but this information may also be expressed as "aaa table", "aaa", "aaa DB", or "aaa queue", or by using an expression other than a data structure, such as a table, a list, a DB, or a queue. To show that the information utilized in the present invention is not dependent on a data structure, "aaa table", "aaa list", "aaa DB", and "aaa queue" may be called "aaa information".

Furthermore, when explaining the content of the respective information, an expression such as "identification information", "identifier", "name" and "ID" will be used, but these are mutually interchangeable.

Furthermore, in the following explanations of the processing operations of the present invention, there may be cases where the explanation treats a "program" or a "module" as the doer of the action (subject), but since the stipulated processing is performed in accordance with a program or a module being executed by a processor while using a memory and a communication port, the processor may be seen as the doer of the action (subject) of the processing. Furthermore, a process that is disclosed as having a program or a module as the subject may be regarded as processing that is performed by a computer, such as a management server, or an information processing apparatus. Either part or all of a program may be realized using dedicated hardware. Furthermore, various types of programs may be installed in respective computers in accordance with a program delivery server or a storage medium.

In this embodiment, no mention will be made of the size of the system that is targeted for management. However, the effect of this embodiment will probably increase the larger the scale of the system becomes.

In this embodiment, a determination is made at the time that an IF-THEN format analysis rule is applied to the topology of the computer system as to whether or not a topology that forms a part of this rule exists in a group of node apparatuses (this group will be called the management-target domain) that are targeted for management by a certain management server.

The node apparatus, for example, comprises a host computer and a storage apparatus. A switch apparatus may be included as a node apparatus.

In this embodiment, a generally used analysis rule will be called a general rule. An analysis rule, which is created by applying a topology denoting the connection status among the respective node apparatuses to the general rule, will be called the expansion rule. The general rule, for example, can also be called a first analysis rule or a criteria analysis rule. The expansion rule, for example, can also be called a second analysis rule or a specific analysis rule.

In a case where one part of the analysis rule is included in the management-target domain, another management server is queried as to whether or not the remaining part of the analysis rule exists in the management-target domain of the other management server. In one embodiment, in a case where the remaining part of the rule exists in the other management-target domain, a reservation is made so as transfer an event when a problem related to the remaining part of the analysis rule has occurred.

Before a problem has occurred (prior to the analysis of the cause of a problem in the Patent Literature 1), an IF-THEN format analysis rule is applied to the topology of the management-target domain. In a case where a part of the analysis rule matches the management-target domain topology, and the remaining part resides in a management-target domain of another management server, a reservation for transferring the event to the other management server is made.

In a case where a problem event has occurred, the management server that receives this event checks the transfer reservation status of this event. In a case where this event must be transferred to another management server, this event is transferred to a reservation-source management server.

As a result of this, in this embodiment, the respective management servers managing the respective management-target domains are able to analyze the cause of a problem even when this problem occurs across multiple management-target domains.

The management server can display the problem analysis result. In a case where a node apparatus of a management-target domain of another management server (will also be called the external management server) is included in the problem analysis result, this node apparatus is displayed so that the user can grasp this fact. For example, the ID of the external management server that manages this node apparatus may be displayed together with this node apparatus, or the node apparatus included in the analysis result may be categorized and displayed with each management server.

In a case where the analysis rule is applied to the topology of a management-target domain and one part of the rule matches the topology of the management-target domain and the remaining part matches an apparatus that exists in an external domain, a query is issued to the other management server.

An invocation relationship with a node apparatus that is lacking will be used at the time of this query. For example, it will be assumed that a storage apparatus $\beta$, which exists in the management-target domain of a management server B, is invoked from a host computer $\alpha$, which exists in the management-target domain of a management server A.

The management server A analyzes the configuration information of the host computer $\alpha$, and as a result of this, detects the fact that this host computer $\alpha$ is invoking the external storage apparatus $\beta$. Consequently, the management server A uses the storage apparatus $\beta$ invocation information to search for the management server in whose management-target domain the storage apparatus $\beta$ is included, and queries the other management server.

When the management server B responds to this query, the management server A knows that the storage apparatus $\beta$ is included in the management-target domain of the management server B. The management server A reserves a problem event transfer with respect to the management server B. The problem event transfer reservation is an instruction for transferring a problem event from the management server B to the management server A in a case where this problem event occurs in the storage apparatus $\beta$.

Furthermore, the management server B can also request that the management server A transfer a problem event related to the host computer $\alpha$. As a result of this, for example, in a case where a problem in the storage apparatus $\beta$ causes a problem to occur in the host computer $\alpha$, this series of problems can be analyzed by both the management server A and the management server B. The result of problem analysis can be displayed without duplication of analysis results by providing a display apparatus (a web server) for centrally managing problem analysis results.

As described hereinabove, in one embodiment, a problem event transfer is reserved in an external management server before a problem occurs. In another embodiment, a problem event required for problem analysis is acquired from the external management server at the time a problem occurs rather than prior to the occurrence of the problem.

For example, in the example described above, the management server A applies the analysis rule at the point in time that the problem occurs in the host computer $\alpha$. The management server A analyzes the configuration information of the host computer α and detects that the host computer α is invoking the storage apparatus β that belongs to the other domain. The management server A uses the storage apparatus β invocation information to search for the management server in whose management-target domain the storage apparatus β is included, and queries this other management server. In response to this query, the management server B transfers the problem event that occurred in the storage apparatus β to the management server A.

In this embodiment, as will be described further below, in a case where individual management servers are respectively managing management-target domains as "management domains", a problem spanning multiple management-target domains can be analyzed by the respective management servers exchanging information related to the problem.

Example 1

The first embodiment is related to a problem cause analysis process in accordance with management software (included in a management server, for example).
<System Configuration>
FIG. 1 is a diagram showing the physical configuration of the computer system according to the present invention. The computer system comprises host computers 10(1) and 10(2), storage apparatuses 20(1) and 20(2), management servers 30(1) and 30(2), web servers 50(1) and 50(2), and IP (Internet Protocol) switches 40(1) and 40(2), and these components are coupled via a network 60.

The computer system comprises multiple management-target domains D1 and D2. The one management-target domain D1 comprises the host computer 10(1), the storage apparatus 20(1), the management server 30(1), the IP switch 40(1), and the web server 50(1). The other management-target domain D2 comprises the host computer 10(2), the storage apparatus 20(2), the management server 30(2), the IP switch 40(2), and the web server 50(2). The one management-target domain D1 is managed by the one management server 30(1). The other management-target domain D2 is managed by the other management server 30(2).

For example, it is possible to provide the management-target domains in storage units, such as racks. Or, a management-target domain can also be configured for each work section.

Furthermore, when no particular distinction is made, the host computers 10(1) and 10(2) will be called the host computer 10, the storage apparatuses 20(1) and 20(2) will be called the storage apparatus 20, management servers 30(1) and 30(2) will be called the management server 30, the IP switches 40(1) and 40(2) will be called the IP switch 40, and the web servers 50(1) and 50(2) will be called the web server 50. The other configurations, which will be described hereinbelow, will also be explained by dropping the numerals (1) and (2) when no particular distinction is made.

The host computer 10 receives a file I/O request from a client computer not shown in the drawing, and accesses the storage apparatus 20 based thereon. The management server 30 manages the operation of the computer system.

Figure 2:
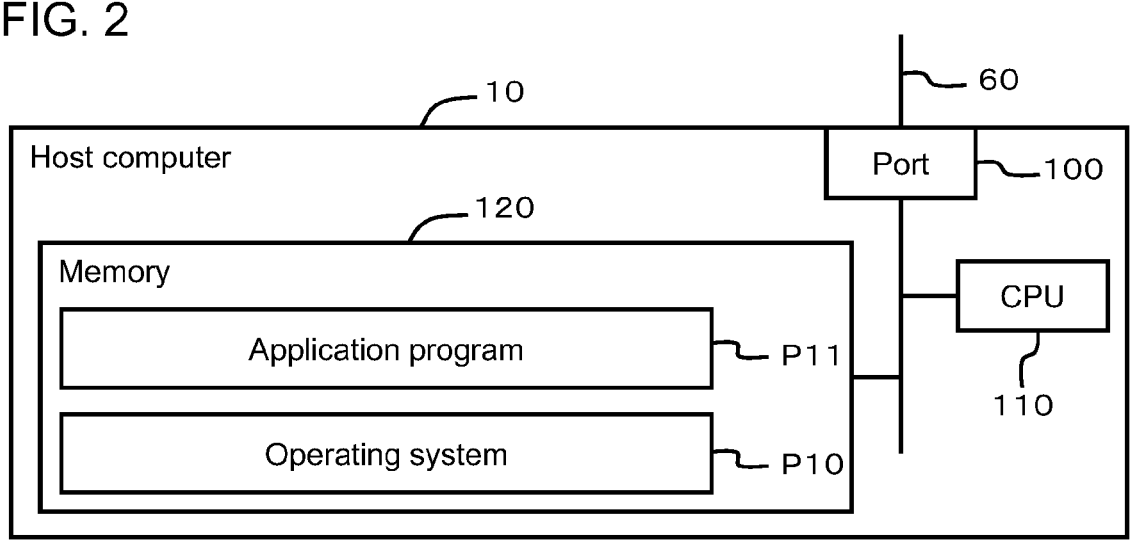
FIG. 2 is a diagram showing an example of the configuration of a host computer.

The web server 50 communicates with the GUI display process module of the management server 30 via the network 60, and displays various types of information on the web browser. The web server 50 is also able to display the information of the management server 30 on a web terminal not included in the drawing in accordance with an operation from this web terminal. The user is able to manage the apparatuses in the computer system by referring to the information displayed on the web browser. Furthermore, the management server 30 and the web server 50 may also be integrated.
<Host Computer Internal Configuration>
FIG. 2 shows the internal configuration of the host computer 10. The host computer 10 comprises a port 100 for connecting to the network 60, a processor 110, and a memory 120, and these components are reciprocally coupled via a circuit, such as an internal bus. Furthermore, the host computer 10 may also comprise a secondary storage device.

The memory 120 stores an application program P11 and an operating system P10.

The application program P11 inputs and outputs data to a storage area provided in accordance with the operating system P10. Data input/output is expressed hereinbelow as I/O. The operating system P10 executes a process that allows the application program P11 to recognize a logical volume of the storage apparatus 20 as a storage area.

Figure 3:
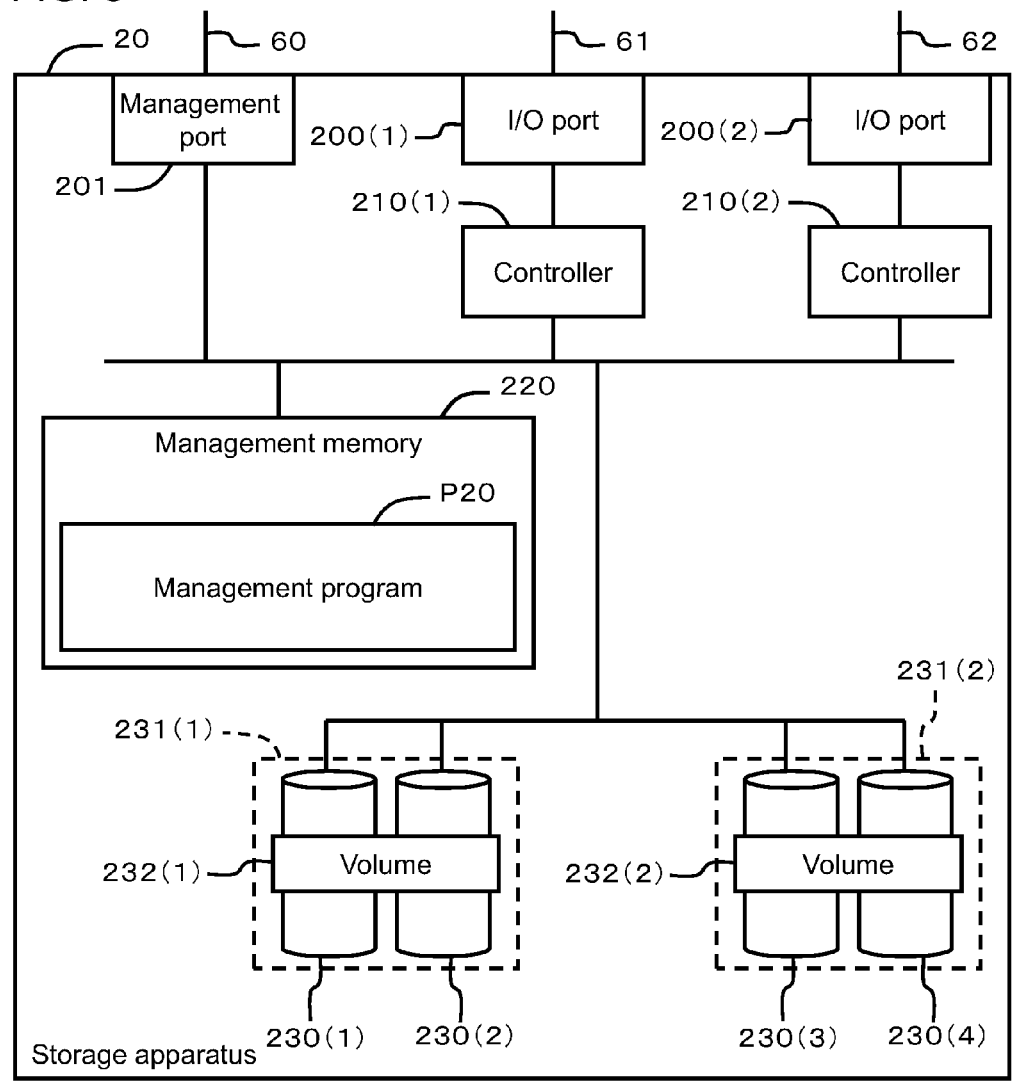
FIG. 3 is a diagram showing an example of the configuration of a storage apparatus.

The port 100 is expressed as a single port comprising an I/O port for carrying out communications with the storage apparatus 20 via iSCSI, and a management port for the management server 30 to acquire management information that is in the host computer 10. Instead of this, the configuration may be such that the I/O port for carrying out communications in accordance with the iSCSI is a separate port from the management port.
<Storage Apparatus Internal Configuration>
FIG. 3 shows an example of the internal configuration of the storage apparatus 20. The storage apparatus 20 comprises I/O ports 200(1) and 200(2), a management port 201, controllers 210(1) and 210(2), a management memory 220, and storage devices 230(1) through 230(4), and these components are reciprocally coupled via a circuit, such as an internal bus.

The I/O ports 200(1) and 200(2) are communication ports for connecting to the host computer 10 over the network 60. The management port 201 is a communication port for connecting to the management server 30 over the network 60. The management memory 220 stores various types of management information and a management program P20. The controllers 210(1) and 210(2) control the operation of the storage apparatus 20.

A storage apparatus management program P20 is stored in the management memory 220. The management program P20 communicates with the management server 30 via the management port 201, and provides the configuration information of the storage apparatus 20 to the management server 30.

RAID groups 231(1) and 231(2) are comprised of multiple storage devices 230. One or more logical volumes 231(1), 232(2) are created by logically partitioning the storage devices of the RAID groups 231(1) and 232(2). Furthermore, the logical volumes 232(1) and 232(2) can also be created based on the storage area of a single storage device.

As the storage device 230, for example, various storage devices, such as a hard disk drive, a semiconductor memory drive, an optical disk drive, a magneto-optical disk drive, a flash memory, a FeRAM (Ferroelectric Random Access Memory) a MRAM (Magnetoresistive Random Access Memory), an Ovonic Unified Memory, and a RRAM (Resistance RAM) can be used.

Internally, the controllers 210(1) and 210(2) are equipped with a processor for controlling the inside of the storage apparatus 20, and a cache memory for temporarily storing data to be exchanged with the host computer 10. Each controller controls the delivery of data between the I/O port 200 and the RAID group 231.

Furthermore, the configuration of the storage apparatus 20 is not limited to the configuration shown in FIG. 3. Any configuration may be used as long as the configuration is able to provide a logical volume to the host computer. For example, the configuration may be such that the controller and the storage device are disposed in different enclosures. Or, the configuration may be such that the management memory is disposed inside the controller. In addition, in a case where redundancy is not required, the configuration may also be such that the storage apparatus 20 only comprises one controller 210.

<Management Server Internal Configuration>

Figure 4:
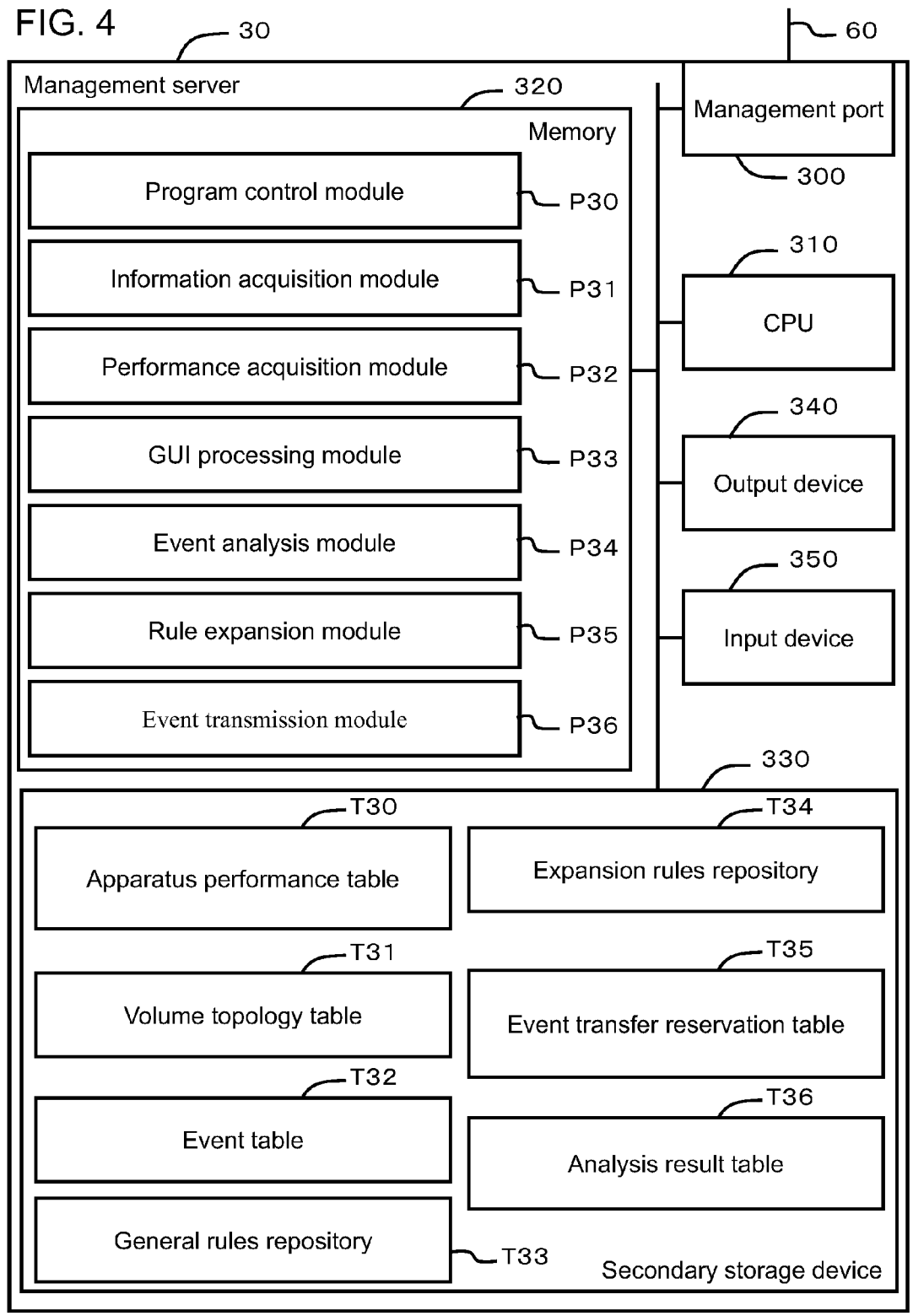
FIG. 4 is a diagram showing an example of the configuration of a management server.

FIG. 4 shows an example of the internal configuration of the management server 30. The management server 30 comprises a management port 300, a processor 310, a memory 320, a secondary storage device 330, an output device 340, and an input device 350, and these components are reciprocally coupled via a circuit, such as an internal bus.

The management port 300 is for connecting to the host computer 10, the storage apparatus 20, the IP switch 40, and the web server 50 over the network 60. The output device 340 comprises a display device or the like for outputting a processing result, which will be described further below. The input device 350 comprises a keyboard or the like for the user to input an instruction.

The memory 320 stores a program control module P30, a configuration management information acquisition module P31, an apparatus performance information acquisition module P32, a GUI display processing module P33, an event analysis module P34, a rule expansion module P35, and an Event transmission module P36. For the sake of convenience, the configuration management information acquisition module P31 will be abbreviated as the information acquisition module P31, the apparatus performance information acquisition module P32 will be abbreviated as the performance acquisition module P32, and the GUI display processing module P33 will be abbreviated as the GUI processing module P33.

Furthermore, in the FIG. 4, the respective modules comprise software modules that are stored in the memory 320. Instead of this, the configuration may be such that each module is a hardware module. The processing carried out by each module may be provided as one or more program codes. A clear boundary need not exist between the modules. A module may read a program.

The secondary storage device 330 stores an apparatus performance management table T30, a volume topology management table T31, an event management table T32, a general rule repository T33, an expansion rule repository T34, an event transfer reservation management table T35, and an analysis result management table T36.

For the sake of convenience, the apparatus performance management table T30 will be abbreviated as the apparatus performance table T30, the volume topology management table T31 will be abbreviated as the volume topology table T31, the event management table T32 will be abbreviated as the event table T32, the event transfer reservation management table T35 will be abbreviated as the event transfer reservation table T35, and the analysis result management table T36 will be abbreviated as the analysis result table T36.

The secondary storage device 330, for example, can be comprised from either one or both of a semiconductor memory device or a hard disk drive.

The GUI display processing module P33 receives a request from the user via the input device 350 and displays the requested configuration management information on the output device 340. Furthermore, the output device 340 and the input device 350 may be separate devices, or may be configured as a single integrated device comprising an input function and an output function.

The management server 30, for example, comprises a keyboard and a pointer device as the input device 350, and comprises a display and a printer or the like as the output device 340. Another device besides these, for example, a device that issues a voiced instruction, may also be used.

In addition, for example, a display computer may be coupled to the management server 30. The user can issue an instruction to the management server 30 or fetch information from the management server 30 via the display computer.

In this specification, a cluster of one or more computers, which manages the computer system (the information processing system) and displays the display information, may be called a management system. In a case where the management server 30 displays the display information, the management server 30 is the management system. A combination of the management server 30 and a display computer (for example, the web server 50 of FIG. 1) is also a management system. To increase the speed and enhance the reliability of management processing, the same processing as that of the management server may be realized using multiple computers. In this case, these multiple computers (to include the display computer in a case where a display computer performs displays) are the management system.

<Apparatus Performance Management Table Configuration>

FIG. 5 shows an example of the configuration of the apparatus performance management table T30. The apparatus performance management table T30, for example, comprises an apparatus ID C300, a component ID C301, a metric C302, an OS type C303, a performance value C304, an alert threshold C305, a threshold type C306, and a status C307.

The apparatus ID C300 stores information for identifying an apparatus that is to be the target of management. "SYS" is configured for the storage apparatus 20, and "HOST" is configured for the host computer 10. The component ID C301 stores information for identifying each part that comprises the management-target apparatus. In a case where the storage apparatus 20 is the management-target apparatus, the management-target component thereof, for example, is the controller 210 or the logical volume 232. In a case where the host computer 10 is the management-target apparatus, the management-target component thereof, for example, is the volume (logical device) on the host computer.

The metric C302 stores the metric name of the performance information of a management-target component. The OS type C303 stores the type of the management-target apparatus operating system, which determines when there is an abnormality based on a threshold. Furthermore, a state in which a determination has been made that there is an abnormality based on a threshold will be called a threshold abnormality here.

The performance value C304 stores the performance value of the management-target component. The management-target component performance value is acquired from the management-target apparatus. The alert threshold C305 stores a threshold for determining that the management-target component performance value is abnormal. The threshold may be configured manually by the user, or may be configured either automatically or semi-automatically. The threshold type C306 stores information for distinguishing whether the threshold configured in the alert threshold C305 is a lower limit or an upper limit. The status C307 stores information for distinguishing whether the management-target component performance value is normal or abnormal.

For example, look at the first row (the first entry) of FIG. 5. The controller (CTL1) inside the storage apparatus (SYS1) is the management-target component. The processor availability ratio of the controller (CTL1) is 40% (refer to C304). A threshold of 20% is configured with respect to the availability ratio of the controller (CTL1) (refer to C305). Since the current availability ratio exceeds the threshold, the management server 30 determines that the controller (CTL1) is overloaded. Therefore, the performance value is configured as an abnormal value in the status C307.

Furthermore, in this embodiment, the amount of I/Os per unit of time (IOPS), the availability ratio, and response time are cited as examples of performance values of the management-target components, but the present invention is not limited to these examples. Management may be carried out using another performance index.

<Volume Topology Management Table Configuration>

FIG. 6 shows an example of the configuration of the volume topology management table T31. The volume topology management table T31, for example, comprises an apparatus ID C310, an external management C311, a volume ID C312, a LU number C313, a controller name C314, a coupling-destination host ID C315, and a coupling-destination drive name C316.

The apparatus ID C310 stores information for identifying a storage apparatus 20. The external management C311 stores a flag denoting that the storage apparatus 20 is not included in the management-target domain of the management server 30. In a case where this storage apparatus 20 is the management target of the management server 30, "NO" is configured in the external management C311. In a case where this storage apparatus 20 is not the management target of the management server 30, that is, a case in which it is being managed by another management server 30 (although this may not always be so), "YES" is configured in the external management C311.

The volume ID C312 stores information for identifying a logical volume 232 of the storage apparatus 20. The LU number C313 stores information for identifying the I/O port 200 that is to be used in communications between the logical volume 232 and the host computer 10. The controller name C314 stores information for identifying the controller 210 in charge of communications between the I/O port 200 and the logical volume 232.

The coupling-destination host ID C315 stores information for identifying the host computer 10 to which the logical volume 232 is coupled. The coupling-destination drive name C316 stores the logical volume drive name on the host computer 10 for which the logical volume 232 is the basis.

For example, look at the first row (the first entry) of FIG. 6. The logical volume (VOL1) of the storage apparatus (SYS1) that resides in the management-target domain of the management server 30 is provided to the host computer as a logical unit denoted as LU1. The logical volume (VOL1) is coupled to the host computer (HOST1) via the storage apparatus controller (CTL1). The logical volume (VOL1) is recognized on the host computer as the logical volume (/var).

<Event Management Table Configuration>

FIG. 7 shows an example of the configuration of the event management table T32. The event management table T32 is referred to as needed in the problem cause analysis process and event transfer process, which will be described further below. The event management table T32, for example, comprises an event ID C320, an external management server ID C321, an apparatus ID C322, a component ID C323, a metric C324, an OS type C325, a status C326, an analysis flag C327, and a time C328. The external management server ID will be shortened to external server ID for the sake of convenience.

The event ID C320 stores information for identifying each event. The external management server ID C321 stores the fact that the event thereof is notified from another management server that manages another domain when this is the case. That is, information for identifying an external management server, which is the event notification source, is stored in C321. In a case where it is an event, which has been detected under the management of the management server 30, that is, a case in which the event is not one that has been notified from an external domain management server (also called the external management server), "N/A" is configured in C321.

The apparatus ID C322 stores information for identifying the apparatus in which the event occurred. The component ID C323 stores information for identifying the component in which the event occurred. The metric C324 stores the name of the metric that detected the threshold abnormality. The OS type C325 stores the type of operating system of the apparatus in which the threshold abnormality was detected. The status C326 stores the state of the component inside the apparatus at the time the event occurred.

The analysis flag C327 stores a flag that denotes whether or not the event thereof has been analyzed in accordance with an event analysis module P34, which will be described further below. In a case where analysis has been completed, "YES" is configured in the C327. In a case where analysis has not been performed, "NO" is configured in the C327. The time C328 stores the time at which the event occurred (date and time).

For example, look at the first row (the first entry) of FIG. 7. The management server 30 detects a threshold abnormality of the processor availability ratio in the controller (CTL1) in the storage apparatus (SYS1), and manages this abnormality as an event (EV1).

<General Rule Configuration>

FIG. 8 shows an example of the configuration of a general rule in the general rule repository T33. The general rule (the same will hold true for the expansion rule to be explained further below) denotes the corresponding relationship between one or more combinations of condition events capable of being generated in the node apparatuses that comprise the computer system, and a conclusion event, which is regarded as the cause of the problem.

Generally speaking, an event propagation model for identifying a cause in a problem analysis lists in an "IF-THEN" format the combination of events for which a certain problem is expected to be generated as a result, and the cause thereof. Furthermore, the general rule is not limited to the one cited in FIG. 8. In addition, there may also be numerous general rules.

The general rule comprises a condition part C330, a conclusion part C331, a general rule ID C332, and an applicable topology C333.

The condition part C330 corresponds to the IF part of the general rule described using the "IF-THEN" format. Multiple observed events are registered. The conclusion part C331 corresponds to the THEN part of the general rule described using the "IF-THEN" format. A causal event is registered.

The condition part C330 and the conclusion part C331 comprise an apparatus type C334, a component type C335, a metric C336, and a status C337. The apparatus type C334 denotes the type of the management-target apparatus, which comprises the component in which the event occurred. The component type C335 denotes the type of the component in which the event has occurred. The metric C336 denotes the metric name of the component performance information. The status C337 denotes the status of the component performance value. The status may include "normal", "threshold abnormality", "bottleneck" and so forth. The bottleneck denotes that the performance of each apparatus registered in the condition part C330 is dropping due to the component thereof.

The general rule ID C332 registers information for identifying the general rule. The applicable topology C333 registers the topology to be acquired when the general rule is deployed in an actual system and an expansion rule is created.

The relationship is such that, in a case where each event registered in the condition part C330 is detected, the event registered in the conclusion part C331 is the cause of the problem, and in a case where the status of the event registered in the conclusion part C331 has become normal, the status of each event registered in the condition part C330 also returns to normal. Furthermore, in the example of FIG. 8, three events are described in the condition part C330, but the number of events is not limited thereto.

For example, in the FIG. 8, the general rule of the general rule ID (R1) comprises three events as observed events. The first event is a response time threshold abnormality (relevant event) of the logical volume on the host computer 10. The second event is a processor operating rate threshold abnormality (causal event) of the controller in the storage apparatus 20. The third event is an lops threshold abnormality (relevant event) of the logical volume in the storage apparatus 20. When the management server 30 detects the three events mentioned above, it is concluded that the processor availability ratio threshold abnormality of the storage apparatus 20 controller 210 is the cause.

Furthermore, in this embodiment, a case in which an event included in an observed event is abnormal is defined in the rule. The fact that a certain condition is normal may be defined as the event included in the observed event instead.

<Expansion Rule Configuration>

FIGS. 9A through 9C show examples of the configurations of expansion rules inside the expansion rule repository T34. These expansion rules are created in accordance with inserting each entry item of the volume topology management table (FIG. 6) in the general rule (FIG. 8).

The expansion rule comprises a condition part C340, a conclusion part C341, an expansion rule ID C342, and a general rule ID C343. The expansion rule ID C342 stores information for identifying the expansion rule. The general rule ID C343 stores the identifier of the general rule on which the expansion rule is based.

The condition part C340 registers an observed event corresponding to the IF part of the expansion rule described using the "IF-THEN" format. The conclusion part C341 registers the causal event corresponding to the THEN part of the expansion rule described using the "IF-THEN" format.

The condition part C340 and the conclusion part C341 comprise an external management server ID C344, an apparatus ID C345, a component ID C346, a metric C347, and a status C348.

The external management server ID (external server ID in the drawing) C344 stores information for identifying the external management server thereof in a case where the management server that discovered the event is a management server managing an external domain.

The apparatus ID C345, the component ID C346, the metric C347, and the status C348 are the same as the apparatus ID C334, the component ID C335, the metric C336, and the status C337 described using FIG. 8, and as such explanations thereof will be omitted.

For example, the expansion rule of FIG. 9A is created in accordance with inserting the controller name (CTL1), the host ID (HOST1), the coupling-destination drive name (/var),
and the LU number (LU1) of the first entry of FIG. 6 into the apparatus type C334 and the component type C335 in the general rule ID (R1).

It is clear from FIG. 9A that the expansion rule comprising the expansion rule ID (ExR1-1) has been expanded based on the general rule comprising the general rule ID (R1). It is also clear from FIG. 9A that it has been concluded that a processor availability ratio threshold abnormality of the controller (CTL1) in the storage apparatus (SYS1) is the cause in the case of the three events that were observed. The first event of the three events constituting the condition is a response time threshold abnormality of the logical volume (/var) on the host computer (HOST1). The second event is the processor availability ratio threshold abnormality of the controller (CTL1) in the storage apparatus (SYS1). The third event is an LOPS threshold abnormality of the logical unit (LU1) in the storage apparatus (SYS1).

Similarly, the expansion rule of FIG. 9B is created in accordance with inserting the controller name (CTL1), the host ID (HOST1), the coupling-destination drive name (/opt), and the LU number (LU1) of the second entry of FIG. 6 into the apparatus type C334 and the component type C335 in the general rule ID (R1).

When creating the expansion rule of FIG. 9B, the entries for apparatus ID (SYS2), which in not the management target of the management server 30, are used. Consequently, the management server 30 creates the expansion rule of FIG. 9B by querying another management server (the external management server) using the steps described further below.

The expansion rule comprising the expansion rule ID (ExR1-2) is expanded and created on the basis of the general rule shown in the general rule ID (R1). This expansion rule comprises three events as observed events. The first event is a response time threshold abnormality of the logical volume (/opt) on the host computer (HOST1). The second event is a processor availability ratio threshold abnormality of the controller (CTL1) of the storage apparatus (SYS2), which is notified from an external management server (SV2). The third event is an IOPS threshold abnormality of the logical unit (LU1) of the storage apparatus (SYS2), which is notified from the external management server (SV2).

When these three events have been detected, it is concluded that the processor availability ratio threshold abnormality of the controller (CTL1) of the storage apparatus (SYS2), which is notified from an external management server (SV2), is the cause.

The expansion rule of FIG. 9C, similarly, is created in accordance with inserting the controller name (CTL2), the host ID (HOST2), the coupling-destination drive name (E:), and the LU number (LU2) of the third entry of FIG. 6 into the apparatus type C334 and the component type C335 in the general rule ID (R1). The expansion rule comprising the expansion rule ID (ExR1-3) is expanded and created on the basis of the general rule shown in the general rule ID (R1). The process for creating the expansion rule will be described further below.

<Event Transfer Reservation Management Table Configuration>

FIG. 10 shows an example of the configuration of the event transfer reservation management table T35. The event transfer reservation management table T35 manages which events of which apparatuses are transferred to which external management servers when it is necessary to transfer an event that has occurred in an apparatus included in the management-target domain of the management server 30 to another management server.

The event transfer reservation management table T35, for example, comprises an apparatus ID C350, a component ID C351, a metric C352, a status C353, a transfer-destination management server ID C354, and a time reservation received C355.

The apparatus ID C350 stores the identifier of the apparatus in which the event occurred. The component ID C351 stores the identifier of the component in which the event occurred. The metric C352 stores the name of the metric for which a threshold abnormality has been detected. The status C353 stores the status of the component inside the apparatus at the time the event occurred. The transfer-destination management server ID C354 stores the identifier of the external management server that is the transfer destination of this event. The time reservation received C355 stores the date and time at which a request was received from the external management server to transfer the information related to the event.

For example, look at the first row (the first entry) of FIG. 10. The management server 30 receives a request from the external management server (SV2) in a case where a prescribed event has been detected to transfer this event to the external management server (SV2).

The prescribed event that is to be transferred to the external management server (SV2) is a case in which a processor availability ratio threshold abnormality has been detected in the controller (CTL1) of the storage apparatus (SYS1). The date and time at which this transfer request was received is "2010-01-01 15:05:00".

<Configuration Management Information Acquisition Process and Volume Topology Management Table Update Process>

The program control module P30, for example, uses a polling process to instruct the configuration management information acquisition module P31 to regularly acquire configuration management information from the storage apparatus 20, the host computer 10 and the IP switch 40 in the computer system. The configuration management information acquisition module P31 may be shortened to the information acquisition module P31.

The information acquisition module P31 acquires configuration management information from the storage apparatus 20, the host computer 10 and the IP switch 40, and updates the volume topology management table T31.

The information acquisition module P31 checks whether or not an entry to be added when updating the volume topology management table T31 is the apparatus ID included in the management-target domain of the management server 30. In a case where this entry is an apparatus ID that is not included in the management-target domain, the information acquisition module P31 registers "YES" in the external management field C311 of the volume topology management table T31.

The volume topology management table T31 shown in FIG. 6 shows that the apparatus ID (SYS2) of the second row and third row (the second and third entries) is not included in the management-target domain of the management server 30.

The program control module P30 creates an expansion rule as follows when the volume topology management table T31 is to be updated.

<Expansion Rule Creation Process>

The program control module P30 instructs the rule expansion module P35 to create an expansion rule either when the program is booted up or when the volume topology management table T31 is updated.

The program control module P30 acquires the general rule from the general rule repository T33. The program control module P30 instructs the rule expansion module P35 to expand the acquired general rules.

Furthermore, in a case where the volume topology management table T31 has been updated, the program control module P30 may instruct the rule expansion module P35 to create an expansion rule by acquiring only the general rule related to the updated part from the general rule repository T33.

Figure 12:
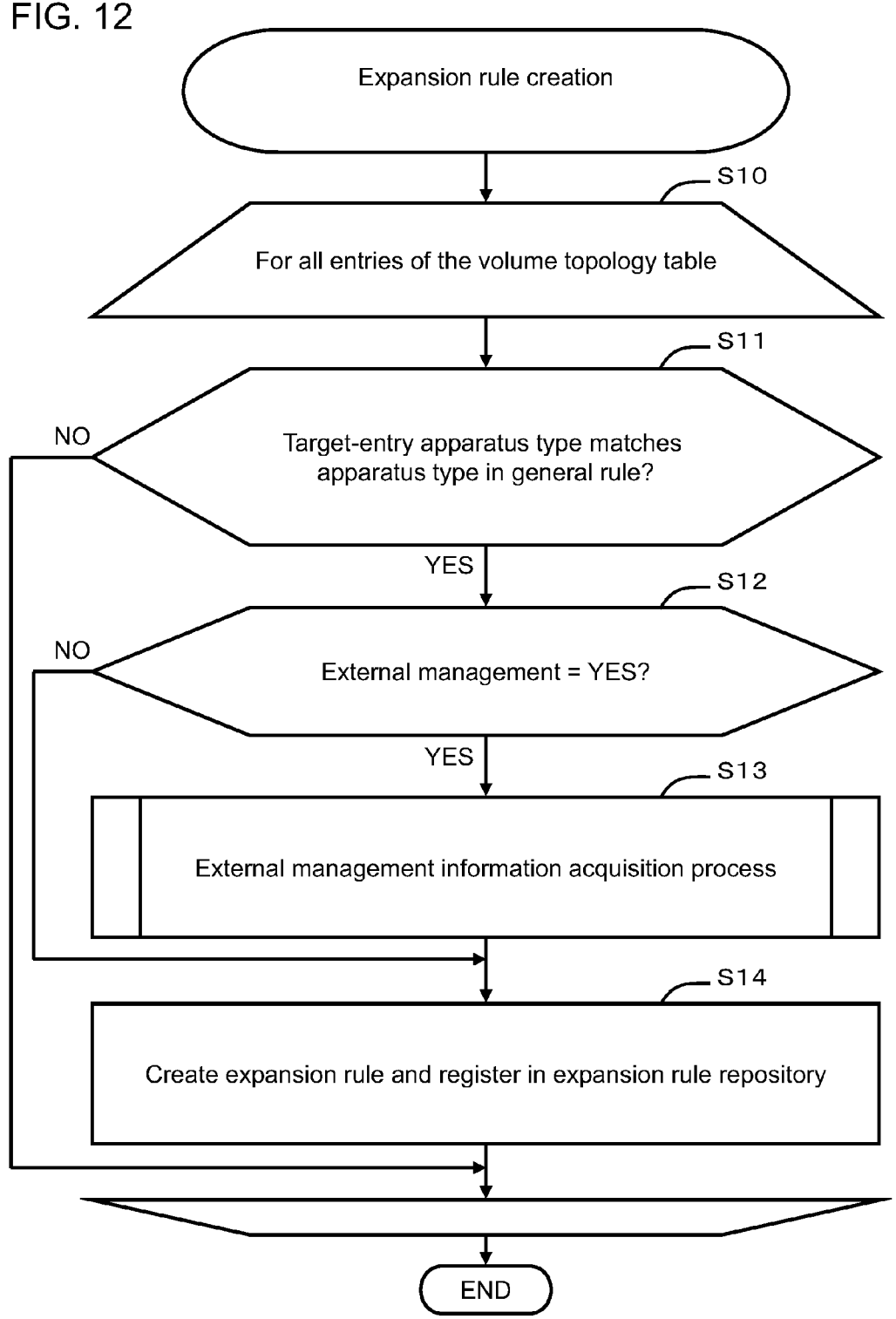
FIG. 12 is a flowchart showing the process of creating the expansion rule.

FIG. 12 is a flowchart showing the process for creating an expansion rule, which is executed by the rule expansion module P35 of the management server 30. The rule expansion module P35 repeats the series of processes described below with respect to each general rule received from the program control module P30.

The rule expansion module P35 acquires the first row (the first entry) of the volume topology management table of FIG. 6 (S10). The rule expansion module P35 determines the apparatus type from the apparatus ID. The rule expansion module P35 determines whether or not the apparatus type included in the acquired entry matches the apparatus type included in the general rule (S11).

In a case where the target-entry apparatus type matches the general rule apparatus type (S11: YES), the rule expansion module P35 determines whether or not the target-entry external management field C311 is configured to "YES" (S12). In a case where the external management feedback is "YES" (S12: YES), the rule expansion module P35 carries out an external management information acquisition process (S13). The rule expansion module P35 uses the external information acquisition process to acquire the ID of the external management server that manages the storage apparatus described in the target entry.

The rule expansion module P35 creates the expansion rule by rewriting the apparatus ID and the component ID corresponding to the general rule with the target-entry apparatus ID and the apparatus component ID, and registers this expansion rule in the expansion rule repository T34 (S14).

The rule expansion module P35, upon acquiring the external management server ID in S13, registers this external management server ID in the external management server ID field C344 of the expansion rule. The rule expansion module P35 repeatedly carries out the processes from S11 through S14 with respect to all the entries of the volume topology management table.

<External Management Information Acquisition Process>

Figure 13:
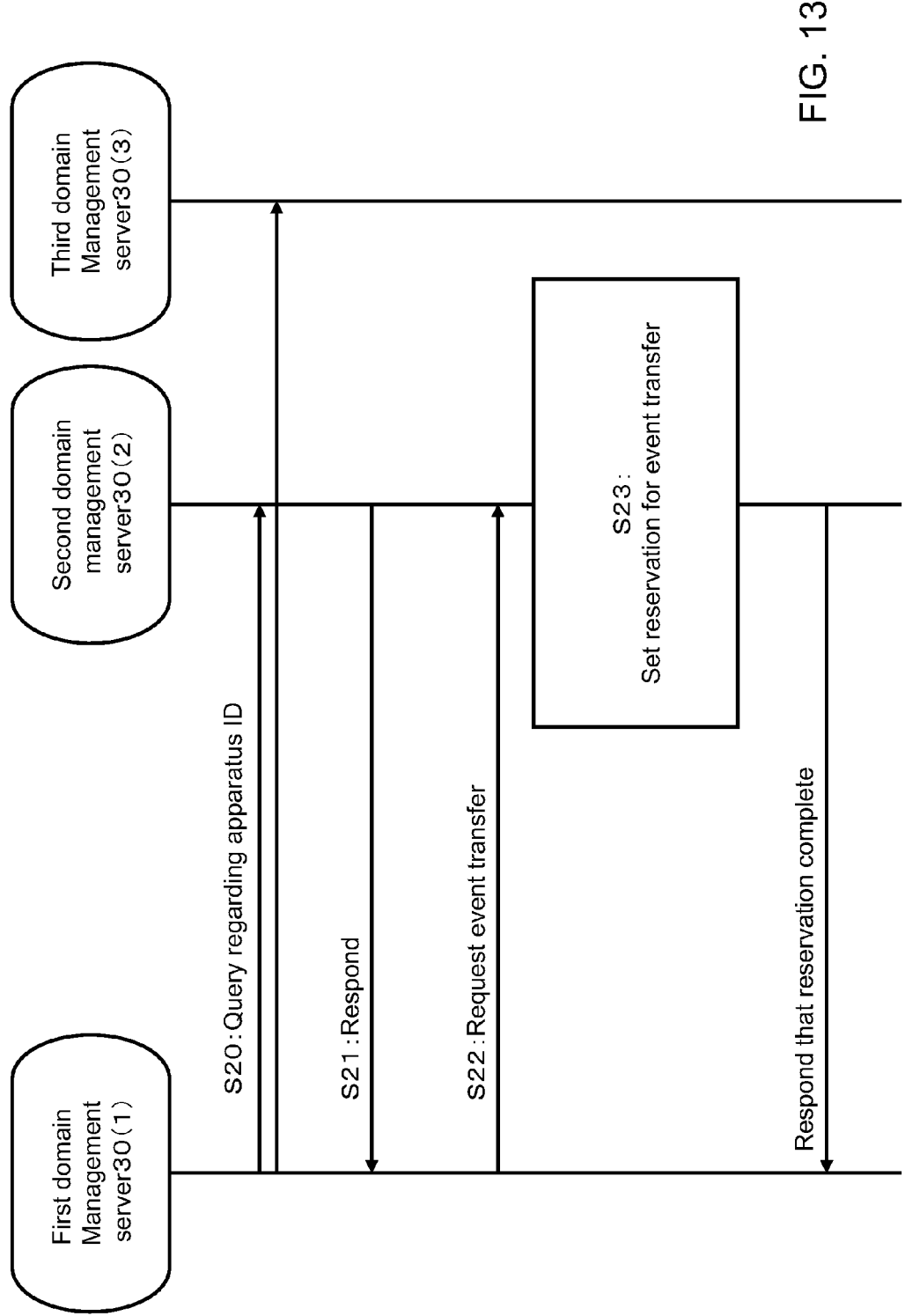
FIG. 13 is a sequence diagram showing the process for reserving an event transfer in an external management server.

FIG. 13 shows the external management information acquisition process executed by the rule expansion module P35. For ease of understanding, the focus will be on the management server 30 of the first domain. The way that the first management server 30 of this first domain communicates with a second management server, which manages a second domain, and a third management server, which manages a third domain, is shown using a sequence diagram. Although the external management server is not limited to two, for convenience sake, two external management servers, i.e. the second management server of the second domain and the third management server of the third domain, are shown in the FIG. 13. For ease of understanding, these management servers will be called the first management server 30(1), the second management server 30(2), and the third management server 30(3) here.

As shown in the volume topology management table T31 of FIG. 6, "YES" is configured in the external management field C311 with respect to the apparatus ID (SYS2) of the second row and the third row (the second and third entries).

That is, the second entry and the third entry are not included in the first domain, which is the management target of the first management server 30(1).

For this reason, the rule expansion module P35 carries out the external management information acquisition process (S13) with respect to the second and third entries, and thereafter executes S20 through S24.

The rule expansion module P35 of the first management server 30(1) queries the second management server 30(2) and the third management server 30(3) via the Event transmission module P36 as to whether or not these servers are managing the apparatus ID (SYS2) in the example given above) (S20).

The management servers queried by the Event transmission module P36 can be configured beforehand in the Event transmission module P36. Or, the Event transmission module P36 may detect the respective management servers 30 over the communication network 60 prior to the query. Either configuration is fine.

It will be supposed that the second management server 30(2) of the external management servers 30(2) and 30(3), which received the query from the first management server 30(1), is managing the apparatus ID included in this query. Therefore, the second management server 30(2) returns a response to the first management server 30(1), which is the source of the query (S21). It will be supposed that the second management server 30(2) comprises the same configuration as the first management server 30(1), and that messages are sent and received using the Event transmission module.

The rule expansion module P35 of the first management server 30(1) reserves an event notification in the second management server 30(2), which returned the response (S22). The rule expansion module P35 of the first management server 30(1) sends the component ID, the monitoring-target metric and the monitoring-target status required in the notification to the second management server 30(2) with respect to the query-target apparatus (S22).

The second management server 30(2) reserves an event transfer in the event transfer reservation management table inside the second management server 30(2) based on the received message (S23). The second management server 30(2) registers the fact that an event is to be transferred to the first management server 30(1) in a case where a specified event occurs with respect to the apparatus specified by the first management server 30(1).

As shown in FIG. 14, the second management server 30(2) comprises an event transfer reservation management table T35 the same as the first management server 30(1). The second management server 30(2) registers the server ID (SV1) of the first management server 30(1) in the "transfer-destination management server ID" field C354 of this event transfer reservation management table T35.

The first entry of FIG. 14 will be explained. The second management server 30(2) notifies the first management server 30(1) in a case where a processor availability ratio threshold abnormality occurs in the controller (CTL1) of the storage apparatus (SYS2) under its management. The second management server 30(2) receives this notification reservation from the first management server 30(1) at "2010-01-01 13:00:00".

The second management server 30(2) responds to the first management server 30(1) to the effect that the reservation has been completed (S24).

<Apparatus Performance Information Acquisition Process and Event Analysis Process>

Figure 15:
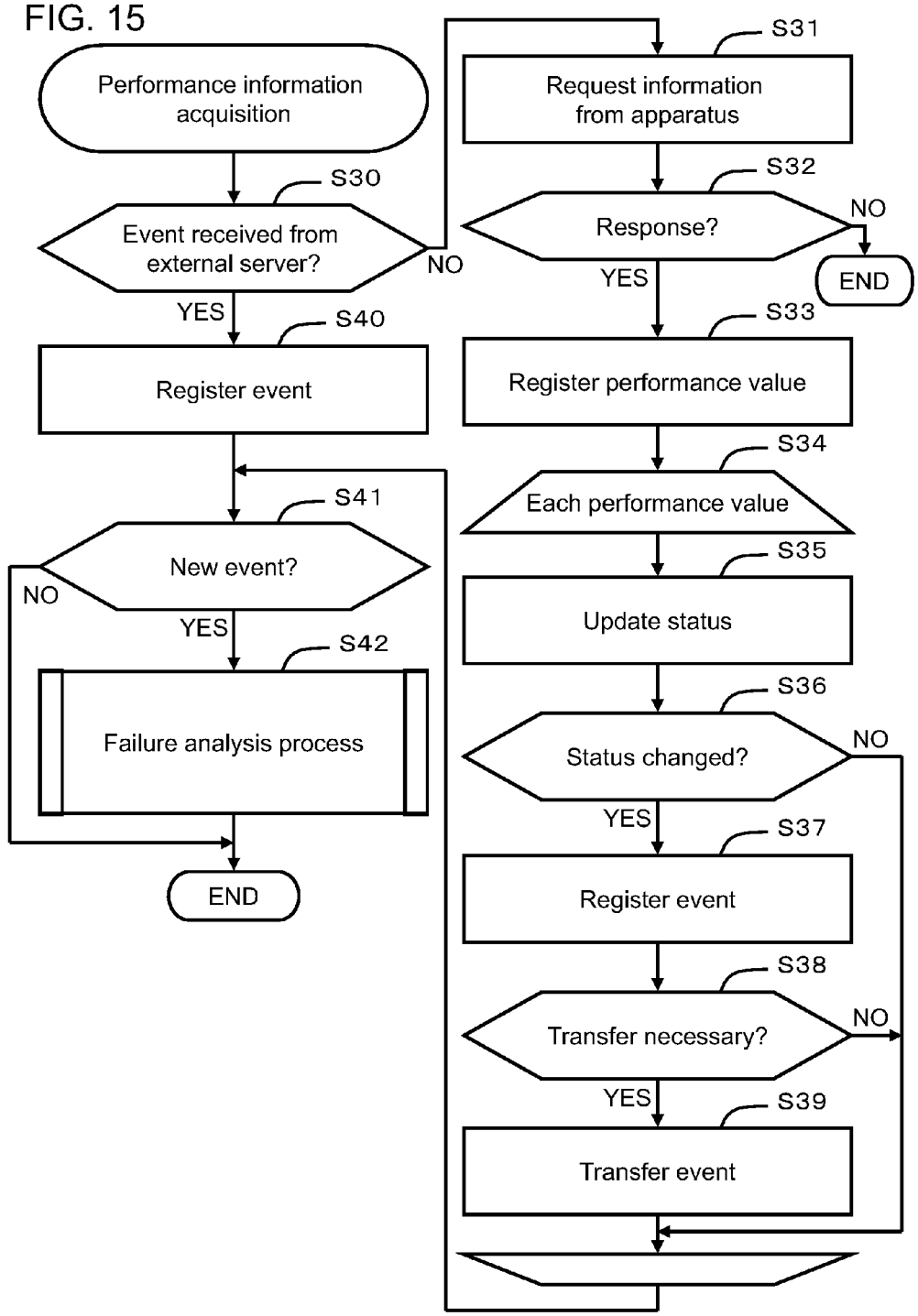
FIG. 15 is a flowchart showing a performance information acquisition process.

FIG. 15 is a flowchart showing an apparatus performance information acquisition process executed by the apparatus performance information acquisition module P32 of the management server 30.

The program control module P30, either when the program boots up or each time a fixed period of time has passed since the previous apparatus performance information acquisition process, instructs the apparatus performance information acquisition module P32 to execute an apparatus performance information acquisition process. Furthermore, the execution instruction need not be issued precisely at each fixed period of time, but rather may be issued repeatedly.

The apparatus performance information acquisition module P32 first checks whether or not an event that was transferred from another management server (an external management server) has been received (S30). As will be explained below in S39, when an event occurs, the apparatus performance information acquisition module P32 transfers the event to another management server as needed. In contrast to this, in S30, the apparatus performance information acquisition module P32 checks whether or not an event has been transferred from another management server.

In a case where an event has not been transferred from another management server (S30: NO), the apparatus performance information acquisition module P32 instructs each monitoring-target apparatus (each management-target apparatus) to send apparatus performance information (S31).

The apparatus performance information acquisition module P32 determines whether or not there was a response from the management-target apparatus (S32). In a case where there has been an apparatus performance information response from a management-target apparatus (S32: YES), the apparatus performance information acquisition module P32 stores the acquired apparatus performance information in the apparatus performance management table T30 (S33). In a case where there has not been a apparatus performance information response from the management-target apparatus (S32: NO), the apparatus performance information acquisition process ends.

The apparatus performance information acquisition module P32 refers to the apparatus performance information stored in the apparatus performance management table T30 and repeats the processing of S35 through S39 with respect to each performance value (S34).

The apparatus performance information acquisition module P32 checks whether the performance value has exceeded a threshold, and updates the status registered in the apparatus performance management table T30 (S35). The apparatus performance information acquisition module P32 determines whether or not the status has changed from normal to a threshold abnormality, or from a threshold abnormality to normal (S36).

In a case where the status has changed (S36: YES), the apparatus performance information acquisition module P32 registers an event in the event management table T32 (S37). The apparatus performance information acquisition module P32 checks whether or not the event registered in the table T32 has a transfer reserved in the event transfer reservation management table T35 (S38).

In a case where a transfer is reserved (S38: YES), the apparatus performance information acquisition module P32 transfers the event to the external management server registered as the notification destination via the Event transmission module P36 (S39). Either when these processes have ended, or when the status has not changed (S36: NO), the apparatus performance information acquisition module P32 returns to S35. When the status checking process has ended with respect to all of the performance values, the apparatus performance information acquisition module P32 proceeds to S41, which will be described further below.

In a case where an event has been transferred from another management server (an external management server) in S30 (S30: YES), the apparatus performance information acquisition module P32 registers the received event in the event management table T32 (S40). The apparatus performance information acquisition module P32 registers the ID of the management server that transferred the event in the external management serve ID field C321 of the event management table T32. Furthermore, the tenth entry (EV10) of the FIG. 7 denotes that the event was sent from the other management server SV2.

The apparatus performance information acquisition module P32 determines whether or not a new event has been added to the event management table T32 (S41). For example, in a case where there is a newly added event, as in a case in which a new abnormality has occurred during processing (S41: YES), the apparatus performance information acquisition module P32 instructs the event analysis module P34 to carry out the problem cause analysis process shown in FIG. 16 (S42). The preceding has been the apparatus performance information acquisition process carried out by the apparatus performance information acquisition module P32.

<Details of Problem Analysis Process (S42)>

Figure 16:
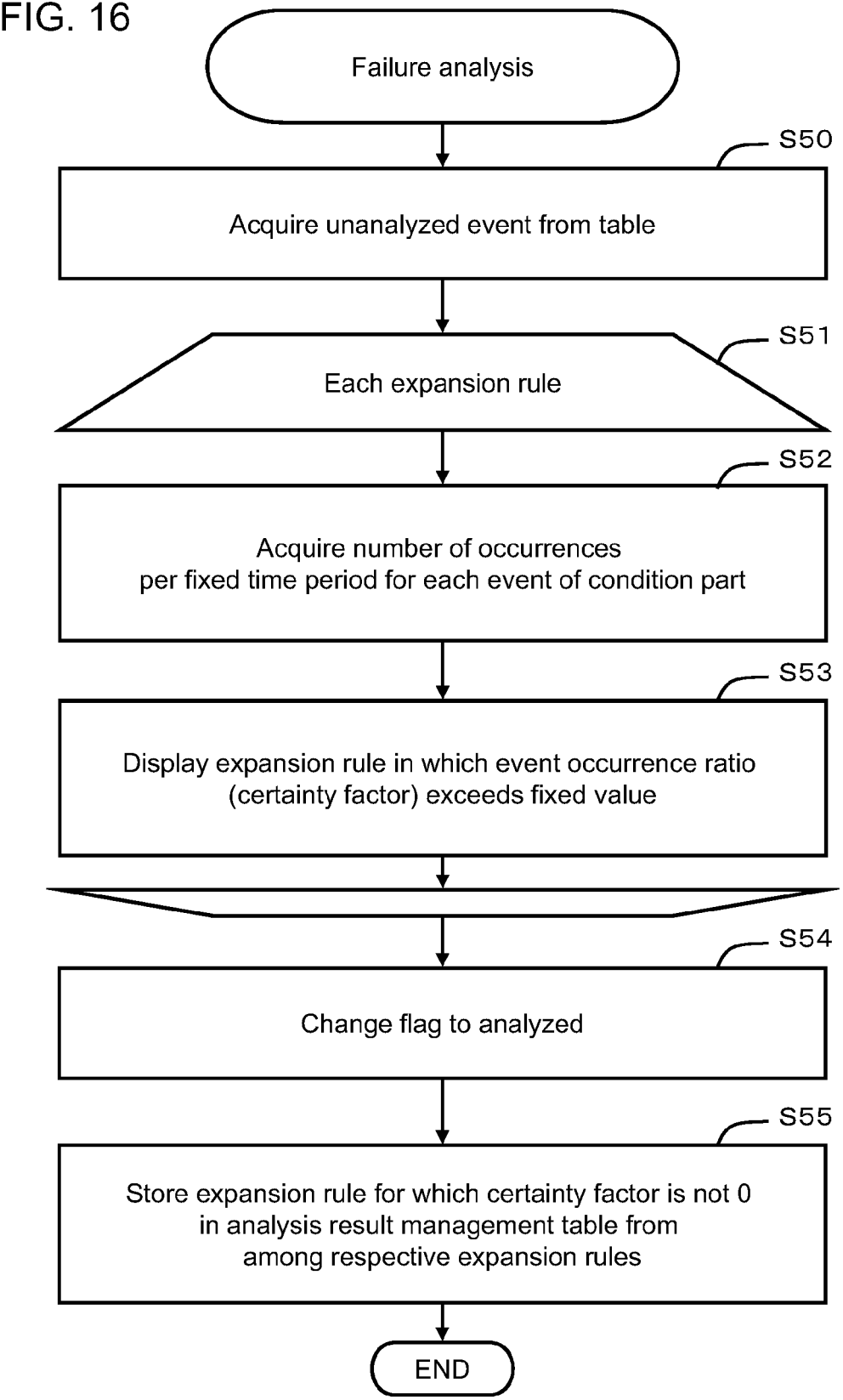
FIG. 16 is a flowchart showing a problem cause analysis process.

FIG. 16 is a flowchart showing the details of the problem cause analysis process (S42 of FIG. 15) executed by the event analysis module P34 of the management server 30.

The event analysis module P34 acquires an event from the event management table T32 for which the analysis flag is not YES (S50). The event analysis module P34 repeats the processing of S52 and S53 with respect to each expansion rule inside the expansion rule repository T34 (S51).

The event analysis module P34 computes the number of occurrences during the past fixed period with respect to each event corresponding to a condition part described in the expansion rule (S52). The event analysis module P34 determines whether or not the number of event occurrences totaled in S52 exceeds a fixed ratio of all the events described in the condition part.

For example, in a case where three events are registered in the condition part, the number of event occurrences can be determined to have exceeded a fixed ratio when two of these three events have occurred. That is, a determination is made as to whether or not the degree of certainty exceeded a pre-scribed value.

In a case where events of equal to or greater than a fixed ratio have occurred, the event analysis module P34 instructs the GUI display processing module P33 to display the problem-causing event together with the event occurrence ratio of the condition part (S53).

When the processing with respect to all of the expansion rules has ended, the event analysis module P34 refers to the event management table T32 and configures YES in the analysis flag C327 with respect to the event(s) acquired in S50 (S54).

The event analysis module P34 stores the expansion rule for which the certainty factor is not 0 from among the respective expansion rules inside the expansion rule repository in the analysis result management table T36 (S55).

S55 will be explained more specifically by referring to FIG. 9A. The expansion rule ExR1-1 defines in the condition part a "response time threshold abnormality of the logical volume (/var) in the host computer (HOST1)", an "availability ratio threshold abnormality of the controller (CTL1) in the storage apparatus (SYS1)", and an "IOPS threshold abnormality of the logical unit (LU1) in the storage apparatus (SYS1)".

In the event management table T32 shown in FIG. 7, it is supposed that the "availability ratio threshold abnormality of the controller (CTL1) in the storage apparatus (SYS1)" has been registered (date/time of occurrence: 2010-01-01 15:05:00). The event analysis module P34 refers to the event management table T32 after waiting for a fixed period of time, and acquires the event (s) that occurred during the past fixed period of time.

The event analysis module P34 computes the number of occurrences during the past fixed period of time with respect to each event corresponding to the condition part described in the expansion rule ExR1-1 of the expansion rule repository T34.

The result is that the "response time threshold abnormality of the logical volume (/var) in the host computer (HOST1)" (relevant event) and the "IOPS threshold abnormality of the logical unit LU1" (relevant event) also occurred in the past fixed period of time. Therefore, the number of occurrences during the past fixed period of time of each event (causal event and relevant events) corresponding to the condition part described in the expansion rule ExR1-1 as a ratio of all the events described in the condition part is 3/3.

Similarly, S55 will be explained by referring to FIG. 9B. The expansion rule ExR1-2 defines in the condition part a "response time threshold abnormality of the logical volume (/opt) in the host computer (HOST1)", an "availability ratio threshold abnormality of the controller (CTL1) in the storage apparatus (SYS2)", and an "IOPS threshold abnormality of the logical unit (LU1) in the storage apparatus (SYS2)".

When the "response time threshold abnormality of the logical volume (/opt) in the host computer (HOST1)" (date/time of occurrence: 2010-01-01 15:05:00) is registered in the event management table T32 shown in FIG. 7, the event analysis module P34 refers to the event management table T32 after waiting for a fixed period of time, and acquires the event (s) that occurred during the past fixed period of time.

Next, the event analysis module P34 computes the number of occurrences during the past fixed period of time with respect to each event corresponding to the condition part described in the expansion rule ExR1-2 of the expansion rule repository T34.

The result is that the "availability ratio threshold abnormality of the controller (CTL1) in the storage apparatus (SYS2)" (relevant event) has also been transferred from the management server (SV2) during the past fixed period of time. Therefore, the number of occurrences during the past fixed period of time with respect to each event (causal event and relevant event) corresponding to the condition part described in the expansion rule ExR1-2 as a ratio of all the events described in the condition part is 2/3.

In a case where the ratio (certainty factor) computed as described hereinabove exceeds a fixed value, the event analysis module P34 instructs the GUI display processing module P33 to display the problem-causing event together with the event occurrence ratio (certainty factor) in the conditional statement.

For example, in a case where the fixed value is 30%, the ratio of occurrences during the past fixed period of time for each event of the condition part of the expansion rule ExR1-1 in the specific example described above is 3/3, that is, 100%. The ratio of occurrences during the past fixed period of time for each event of the condition part of the expansion rule ExR1-2 is 2/3, that is, 66%. Therefore, both analysis results are displayed on the GUI.

The above processing is executed with respect to all of the expansion rules defined in the expansion rule repository T34. The preceding has been the problem analysis process carried out by the event analysis module P34.

<Analysis Result Management Table Configuration>

FIG. 11 is a diagram showing an example of the configuration of the analysis result management table T36. The analysis result management table T36, for example, comprises a cause apparatus ID C360, a cause component ID C361, an external server ID C362, a metric C363, a certainty factor C364, an expansion rule ID C365, a received event ID C366, and a time of analysis C367.

The cause apparatus ID C360 stores the identifier of the apparatus in which the event, which was determined to be the cause of the problem in the problem analysis process, has occurred. The cause component ID C361 registers the identifier of the component in the apparatus in which the event occurred. The external server ID C362 registers the ID of the external management server, which issues a notification about the event that has been determined to be the cause of the problem. The metric C363 registers the name of the metric with respect to which a threshold abnormality has been detected. The certainty factor C364 registers the occurrence ratio of events described in the condition part of the expansion rule. The expansion rule ID C365 registers the ID of the expansion rule that constitutes the basis upon which one event has been determined to be the cause of the problem. The received event ID C366 registers the ID of the event that was actually received from among the events described in the condition part of the expansion rule. The time of analysis C367 registers the date and time at which the problem analysis process accompanying the event occurrence was started.

For example, look at the second row (the second entry) of FIG. 11. The fact that the processor availability ratio threshold abnormality in the controller (CTL1) of the storage apparatus (SYS2) managed by the other management server (SV2) has been determined to be the cause of the problem based on the expansion rule ExR1-2 is denoted in this entry. In addition, this entry also denotes the fact that the management server received two events (EV7 and EV10) as the basis for this determination, and that the condition event occurrence ratio (certainty factor) is 2/3.

<Problem Analysis Result Display Screen Configuration>

FIG. 17 is a diagram showing the problem analysis result display screen G10, which the management server 30 displays to the user (administrator).

The problem analysis result display screen G10 displays the analysis result defined in the analysis result management table T36. Two types of problem analysis results are displayed in the screen G10.

First, the result of the analysis of the problem that occurred in the management server-managed domain is displayed in the table G10. The entry in which the management server ID is not listed in the external management server ID field C362 of the analysis result management table T36 is partially displayed in a table GP11. The expansion rule ID and the received event ID included in the analysis result management table T36 are not displayed in a table GP10 of the screen G10. However, the configuration may be such that the expansion rule ID and the received event ID are displayed in the table GP10 when the user so desires. The same holds true for the table GP11, which will be described next.

Second, the analysis result of the problem that occurred in the domain managed by the external management server is displayed in the GP11. The entry in which the management server ID is listed in the external management server ID field C362 of the analysis result management table T36 is partially displayed in the table GP11.

The first table GP10 shows the in-domain analysis result. The second table GP11 shows the external domain analysis result. The second table GP11 also displays the server ID for identifying the management server (external management server) that is managing the problem that is the cause. Therefore, even in a case where a problem spanning multiple domains has occurred, the user can immediately discern which problem, i.e. the problem that occurred in which component of which apparatus in which domain, constitutes the cause.

According to the detailed description above, in accordance with this embodiment, the management servers that manage respective domains communicate with one another as needed. Therefore, it is possible to accurately and quickly determine whether or not a problem that occurred in the management-target domain is the cause of a problem that occurred in another domain that is not the management target.

According to the above description, in a case where a problem that has occurred inside the management-target domain is related to a problem that occurred in a domain external to the management-target domain, the management server 30 deduces the cause of the problem by communicating with the other management server in charge of this problem.

In this embodiment, an external management server, which is needed to analyze a problem based on an analysis rule, is identified, and a request to transfer a problem event to this external management server is made in advance so as to make it possible to analyze the cause of a problem that extends beyond a domain. When a prescribed problem occurs in the management-target domain of its own apparatus, the external management server to which the request was made transfers the event related to this problem to the request-source management server.

The request-source management server analyzes the cause of the problem based on the problem event that occurred in the management-target domain of its own apparatus and the problem event received from the external management server. The result of the analysis of the cause of the problem is provided to the user by way of the screen G10 of FIG. 17.

Therefore, by checking the screen G10, the user is able to readily determine which cause candidate inside the management-target domain to deal with and/or whether to ask another user, who is managing the external management server, to deal with the problem. As a result, in a case where a computer system is managed by management servers that differ for each of multiple domains, problem cause analysis and problem recovery work can be easily performed. This makes it possible to reduce a user's management time and trouble, and to enhance user usability.

Example 2

A second embodiment will be explained by referring to FIGS. 18 through 27. In this embodiment, the explanation will focus on the differences with the first embodiment. In the first embodiment, a reservation is made in advance so as to transfer an event when a problem occurs in an external management server that manages an external domain. In this embodiment, a query with respect to a problem is made to an external management server as needed during problem analysis.

<Internal Configuration of Management Server>

FIG. 18 shows an example of the configuration of a management server 30A of this embodiment. The management server 30A comprises 300, 310, 320, and 330 the same as the management server 30 shown in FIG. 4. The respective tables T30, T31, T32, T33, T34 and T36 are stored in the secondary storage device 330 of the management server 30A. FIG. 18 differs from FIG. 4 in that the management server 30A does not comprise the event transfer reservation table T35. As described above, this is because in this embodiment the configuration is such that an event transfer is not reserved in advance, but rather a problem event is acquired as needed during problem analysis. Furthermore, in the following explanation, the management server 30A will be called the management server 30.

<Expansion Rule Configuration>

FIGS. 19A through 19C show examples of configurations of expansion rules stored in an expansion rule repository T34A. These expansion rules are created by inserting the items of each entry of the volume topology management table in the general rule.

In FIG. 9A, the ID of an external management server is managed in C344. In this embodiment, the flag as to whether or not a management server belongs to an external domain is changed (C344A). In the case of an apparatus which belongs to the management-target domain of the management server 30, "NO" is configured in the C344A. In the case of an apparatus which belongs to another domain (an external domain), which is not the management-target domain of the management server 30, "YES" is configured in the C344A.

Since FIG. 19A correspond to FIG. 9A, FIG. 19B corresponds to FIG. 9B, and FIG. 19C corresponds to FIG. 9C, further explanations will be omitted.

<Expansion Rule Creation Process>

The program control module P30 instructs the rule expansion module P35 to create an expansion rule either when the program is booted up or when the volume topology management table is updated. For this reason, the program control module P30 acquires the general rule from the general rule repository T33, and instructs the rule expansion module P35 to expand the acquired general rules. Furthermore, although not stipulated in the present invention, with regard to an instruction issued at the time of a volume topology management table update, an instruction may be given to create an expansion rule by acquiring only the general rule related to the updated part from the general rule repository T33.

Figure 20:
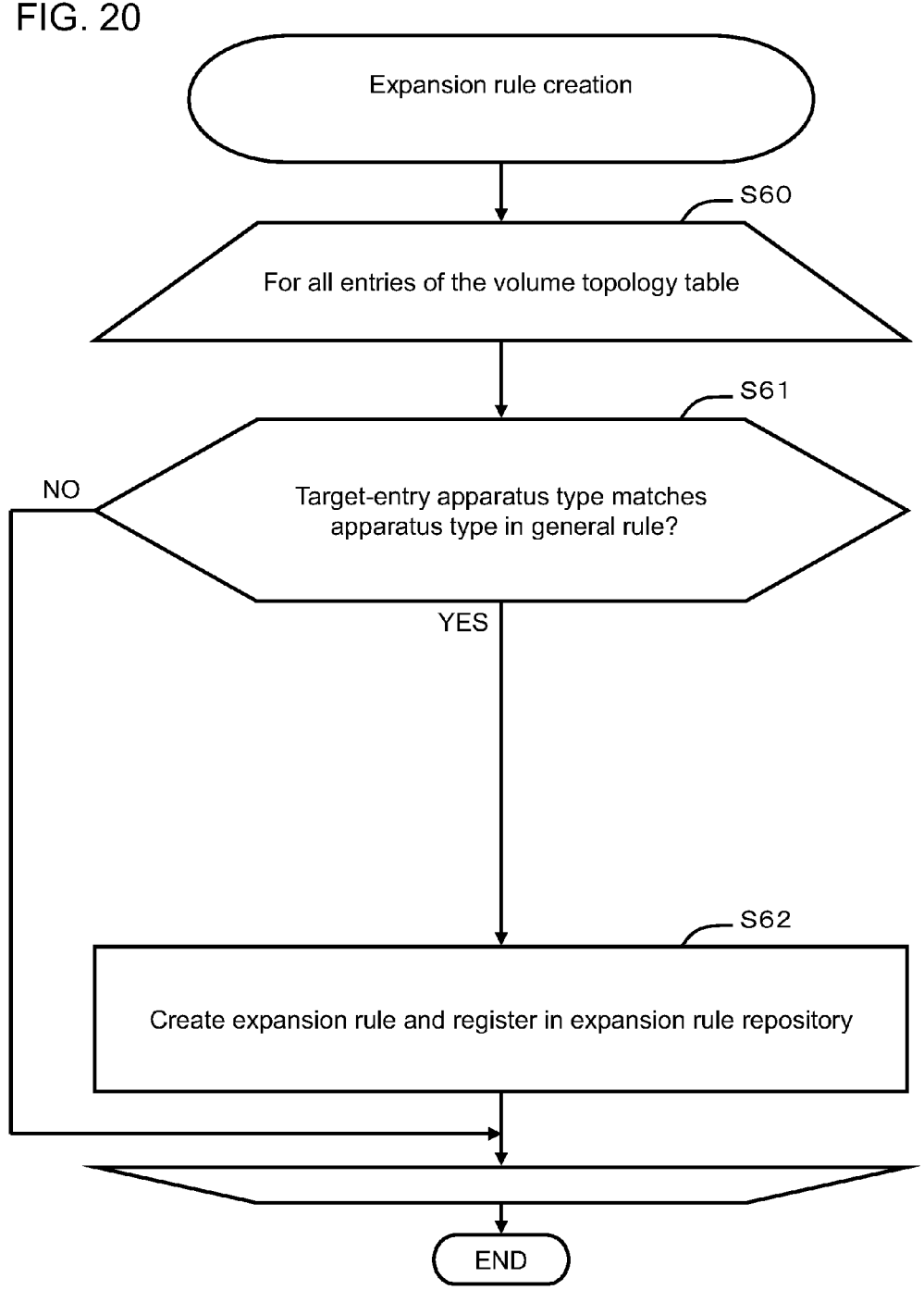
FIG. 20 is a flowchart showing an expansion rule creation process.

FIG. 20 is a flowchart showing the process for creating an expansion rule, which is executed by the rule expansion module P35. The rule expansion module P35 repeats the series of processes described below with respect to each general rule received from the program control module P30.

The rule expansion module P35 acquires the first row (the first entry) of the volume topology management table T31 (S60). The rule expansion module P35 determines the apparatus type from the apparatus ID. The rule expansion module P35 determines whether or not the apparatus type included in the acquired entry matches the apparatus type included in the general rule (S61).

In a case where the target-entry apparatus type matches the general rule apparatus type (S61: YES), the rule expansion module P35 rewrites the apparatus ID and the component ID corresponding to the general rule with the apparatus ID and the apparatus component ID of the target entry. The rule expansion module P35 creates an expansion rule and registers the created expansion rule in the expansion rule repository T34. The rule expansion module P35 repeatedly carries out the processes from S60 through S62 with respect to all the entries of the volume topology management table T31.

<Apparatus Performance Information Acquisition Process and Event Analysis Process>

Figure 21:
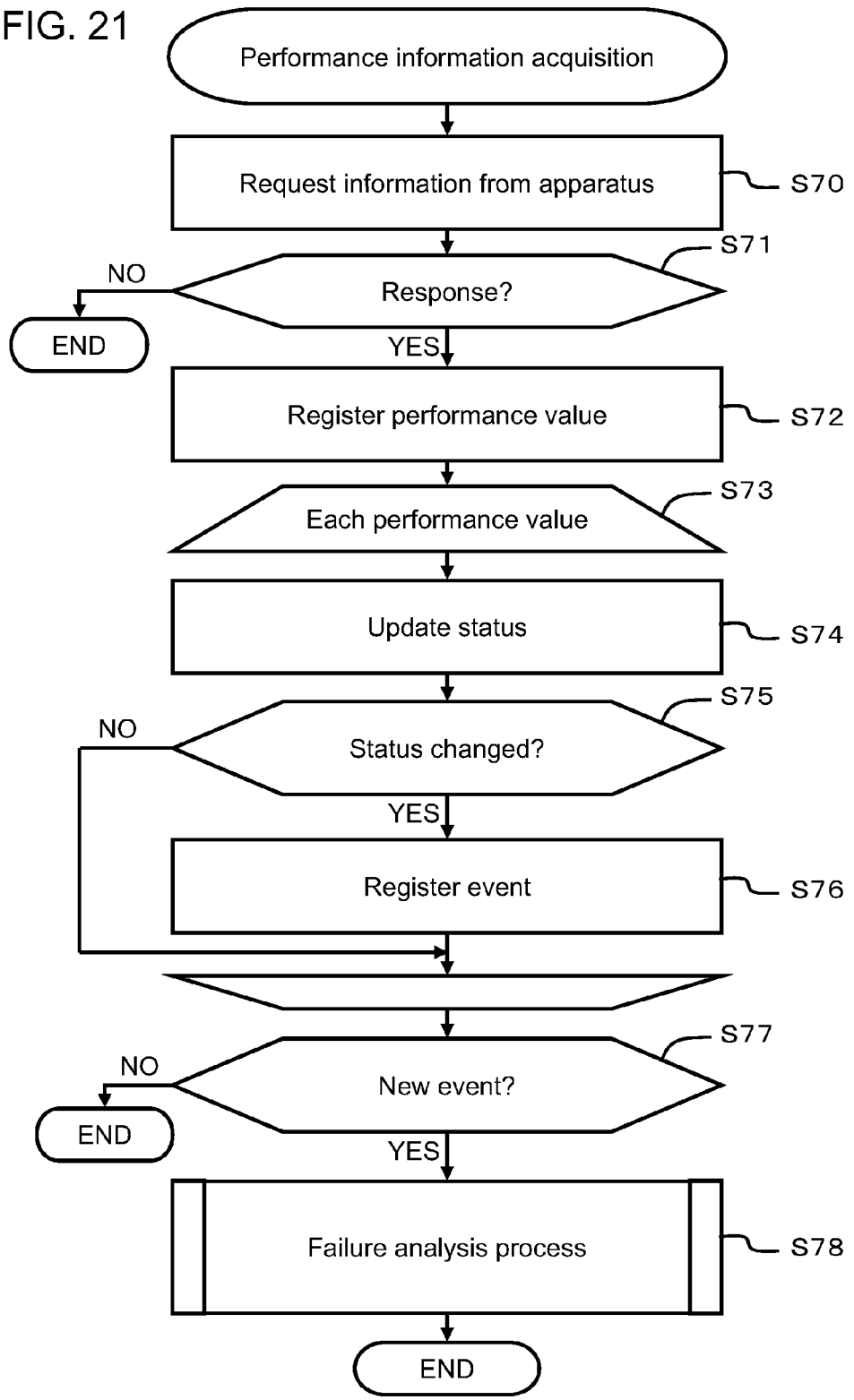
FIG. 21 is a flowchart showing a performance information acquisition process.

FIG. 21 is a flowchart showing an apparatus performance information acquisition process executed by the apparatus performance information acquisition module P32.

The same as was described using FIG. 15, the program control module P30, either when the program boots up or each time a fixed period of time has passed since the previous apparatus performance information acquisition process, instructs the apparatus performance information acquisition module P32 to execute an apparatus performance information acquisition process.

The apparatus performance information acquisition module P32 instructs each management-target apparatus to send apparatus performance information (S70).

The apparatus performance information acquisition module P32 determines whether or not there was a response from the management-target apparatus (S71). In a case where there has been an apparatus performance information response from a management-target apparatus (S71: YES), the apparatus performance information acquisition module P32 stores the acquired apparatus performance information in the apparatus performance management table T30 (S72). In a case where there has not been a apparatus performance information response from the management-target apparatus (S71: NO), the configuration management information acquisition process ends.

The apparatus performance information acquisition module P32 refers to the apparatus performance information stored in the apparatus performance management table T30 and repeats the processing of S74 through S79 with respect to each performance value (S73).

The apparatus performance information acquisition module P32 checks whether the performance value exceeds a threshold, and updates the status registered in the apparatus performance management table T30 (S74). The apparatus performance information acquisition module P32 determines whether or not the status changed from normal to a threshold abnormality or from a threshold abnormality to normal (S75).

In a case where the status has changed (S75: YES), the apparatus performance information acquisition module P32 registers an event in the event management table T32 (S76). Either when these processes have ended or when the status has not changed (S75: NO), the apparatus performance information acquisition module P32 returns to S74.

The apparatus performance information acquisition module P32 determines whether or not a new event has been added to the event management table T32 (S77). For example, in a case where a new event has been added, as in a case in which a new abnormality has occurred during processing (S77: YES), the apparatus performance information acquisition module P32 instructs the event analysis module P34 to carry out the problem cause analysis process shown in FIG. 22 (S78). The above has been the apparatus performance information acquisition process carried out by the apparatus performance information acquisition module P32.

<Details of Problem Analysis Process>

Figure 22:
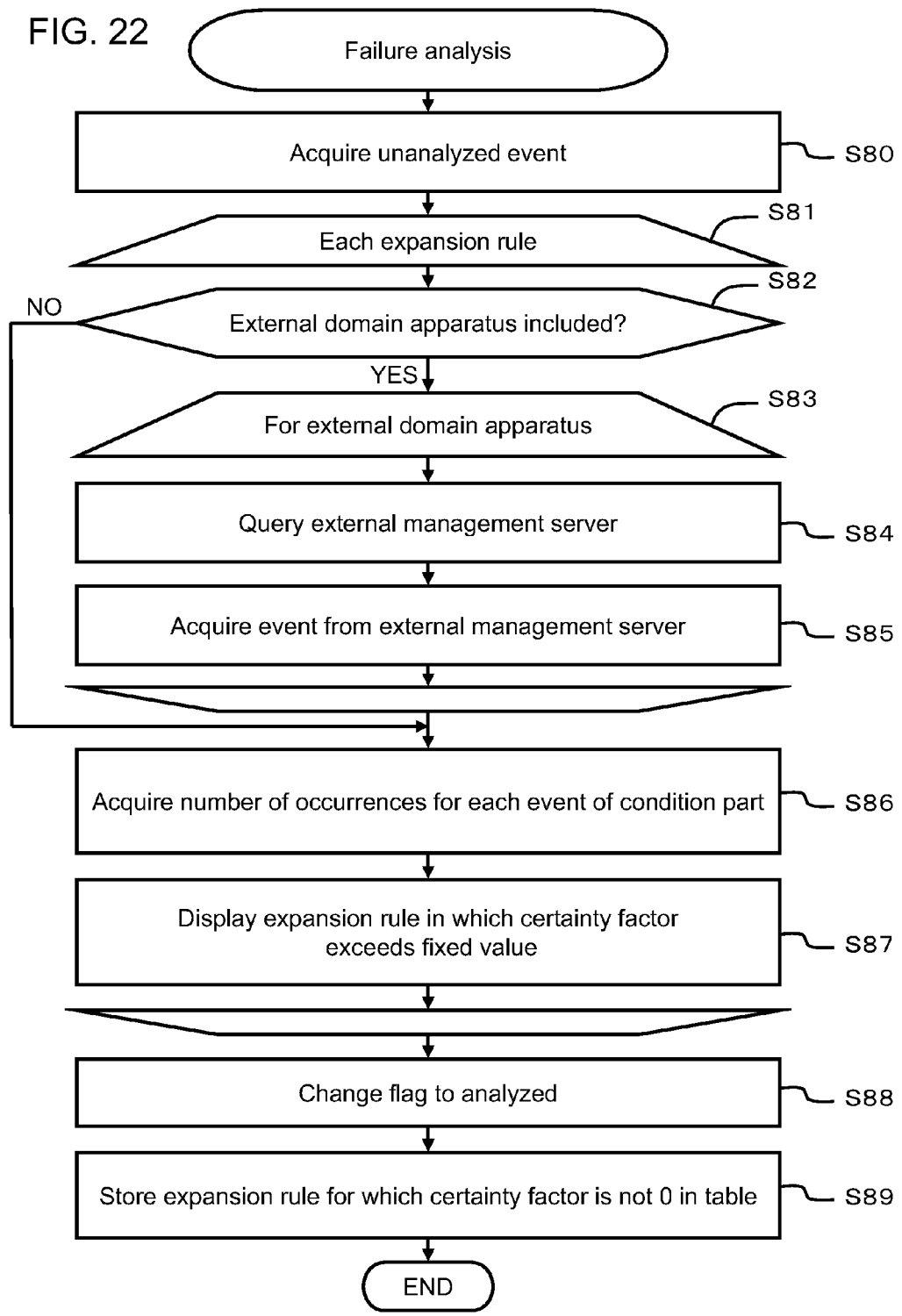
FIG. 22 is a flowchart showing a problem cause analysis process.

FIG. 22 is a flowchart showing the problem analysis process executed by the event analysis module P34.

The event analysis module P34 acquires an event from the event management table T32 for which the analysis flag is not YES (S80).

The event analysis module P34 repeats the processing from S82 through S85 with respect to each expansion rule inside the expansion rule repository T34 (S81).

The event analysis module P34 checks whether the apparatus, for which "YES" is registered in the external management-target domain field C344A, is included in the expansion rule (S82). In a case where the expansion rule includes an apparatus managed in the external domain (S82: YES), the event analysis module P34 repeats S84 and S85 with respect to all the apparatuses for which "YES" is registered in the external management-target domain field C344A.

The event analysis module P34 queries the external management server, which is managing the apparatus ID, via the Event transmission module P36 (S84). The configuration may be such that the management server, which is the destination of the query from the Event transmission module P36, is configured in the Event transmission module P36 beforehand or detected over the network 60 by the Event transmission module P36 prior to carrying out the query.

For ease of understanding, the explanation here will give the management server, which is executing the processing of FIG. 22, as 30(1), and the external management server, which is managing the query-related apparatus, as 30(2).

Of the external management servers that receive the query, the external management server 30(2), which is managing the prescribed apparatus ID that is being queried, returns a response to the management server 30(1).

The rule expansion module P35 of the management server 30(1) queries the management server 30(2) that returned the response as to whether or not an event has occurred in the prescribed apparatus. In a case where an event has occurred in the prescribed apparatus, the rule expansion module P35 acquires information related to this event from the management server 30(2), and registers this information in the event management table T32 (S85).

The event analysis module P34 queries the external management server with respect to all of the apparatuses for which "YES" is registered in the external management-target domain field C344A. Upon acquiring the event that occurred, the event analysis module P34 computes the number of occurrences during the past fixed period of time for each event corresponding to the condition part C340 listed in the expansion rule (S86).

Next, the event analysis module P34 determines whether the number of event occurrences exceeds a fixed value, i.e. a ratio of all the events described in the condition part C340. In a case where this fixed value has been exceeded, the event analysis module P34 instructs the GUI display processing module P33 to display the event that constitutes the cause of the problem together with the event occurrence ratio (certainty factor) in the condition statement (S87).

When the processing with respect to all the expansion rules has ended, the event analysis module P34 refers to the event management table T32 and configures the analysis flag C327 to YES with respect to the event acquired in S80 and the event registered in S85 (S88).

The event analysis module P34 stores the expansion rule for which the certainty factor is not 0 from among the respective expansion rules inside the expansion rule repository in the analysis result management table T36 (S89).

The above-described processing is executed with respect to all the expansion rules defined in the expansion rule repository T34. The preceding has been the problem analysis process carried out by the event analysis module P34.

According to this embodiment, the same operational advantages as the first embodiment are achieved. In addition, in this embodiment, the problem event, which occurred in another domain, and which is necessary for applying the expansion rule, is collected when a problem event has occurred in one's own domain. In this embodiment, the management server of another problem management domain is queried as to whether or not another problem event included in an expansion rule has occurred and the cause of the problem is analyzed only when this expansion rule includes a problem event that occurred in one's own domain.

Therefore, in this embodiment, there is no need to provide a configuration and steps for reserving an event transfer beforehand as in the first embodiment. Therefore, this embodiment can be realized using a simpler configuration than the first embodiment. However, since this embodiment queries about a problem that has occurred in an external domain when a problem has occurred, in a case where it is necessary to query a large number of external management servers, the load required for the query becomes high. Therefore, there is the likelihood that the time required for analyzing the problem will be longer than in the first embodiment.

Example 3

A third embodiment will be explained by referring to FIGS. 23 through 28. In this embodiment, multiple management servers 30 are centrally managed using a single web server 50.

In the first embodiment and the second embodiment, the management server 30(1) and the management server 30(2) analyzed problems that occurred in the respective management-target domains D1 and D2, and the results of this analysis were displayed on the web servers 50(1) and 50(2) corresponding to the respective management servers 30(1) and 30(2). This is because it is assumed that respectively different users are managing the management servers 30(1) and 30(2).

Alternatively, this embodiment proposes a configuration in which a single user can centrally manage a large-scale information system (computer system). Furthermore, this embodiment will be explained on the premise of the second embodiment, and this embodiment can also be applied to the first embodiment.

<System Configuration>

Figure 23:
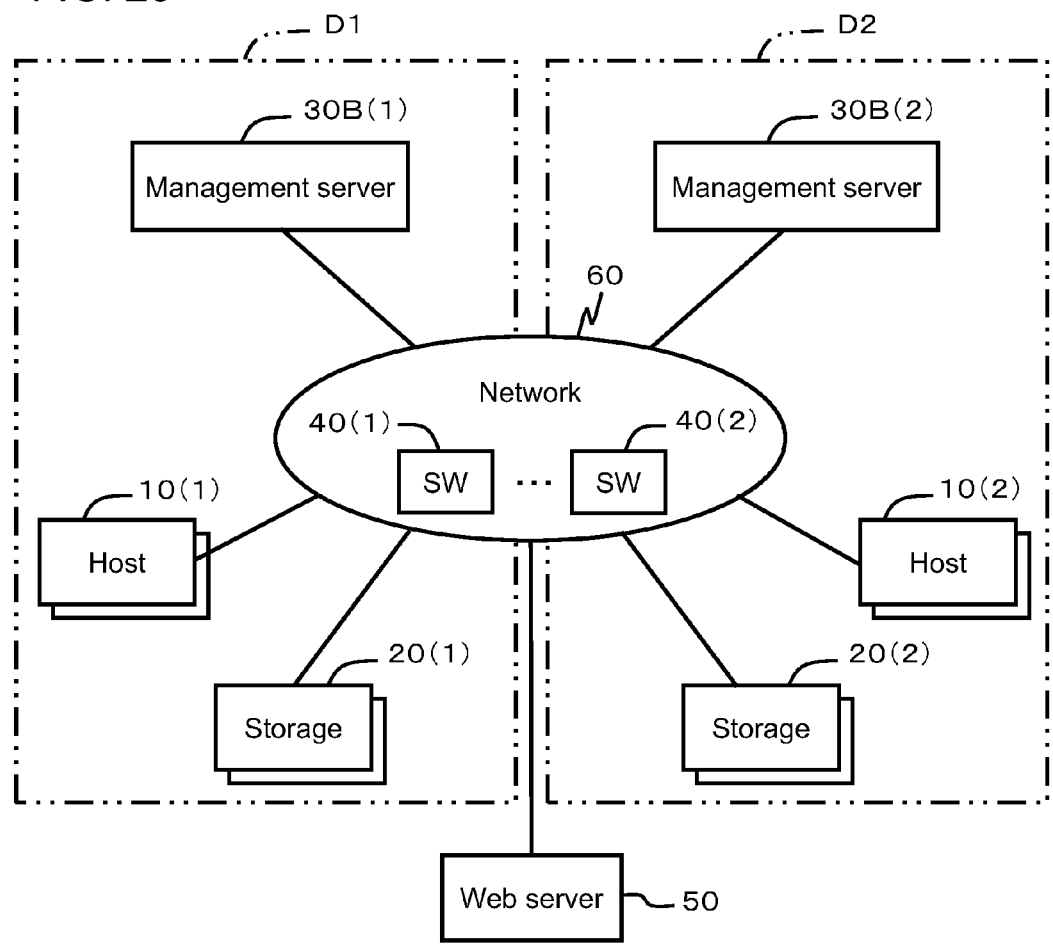
FIG. 23 is a diagram showing an example of the physical configuration of a computer system in a third embodiment.

FIG. 23 shows the physical configuration of a computer system. The computer system comprises two management-target domains D1 and D2. Each domain comprises a host computer 10, a storage apparatus 20, a management server 30B, and an IP switch 40, and these components are coupled via a network 60.

A web server 50 communicates over the network 60 with an analysis result transmission module P37 in each management server 30B(1) and 30B(2), and displays various types of information on a web browser.

<Internal Configuration of Management Server>

Figure 24:
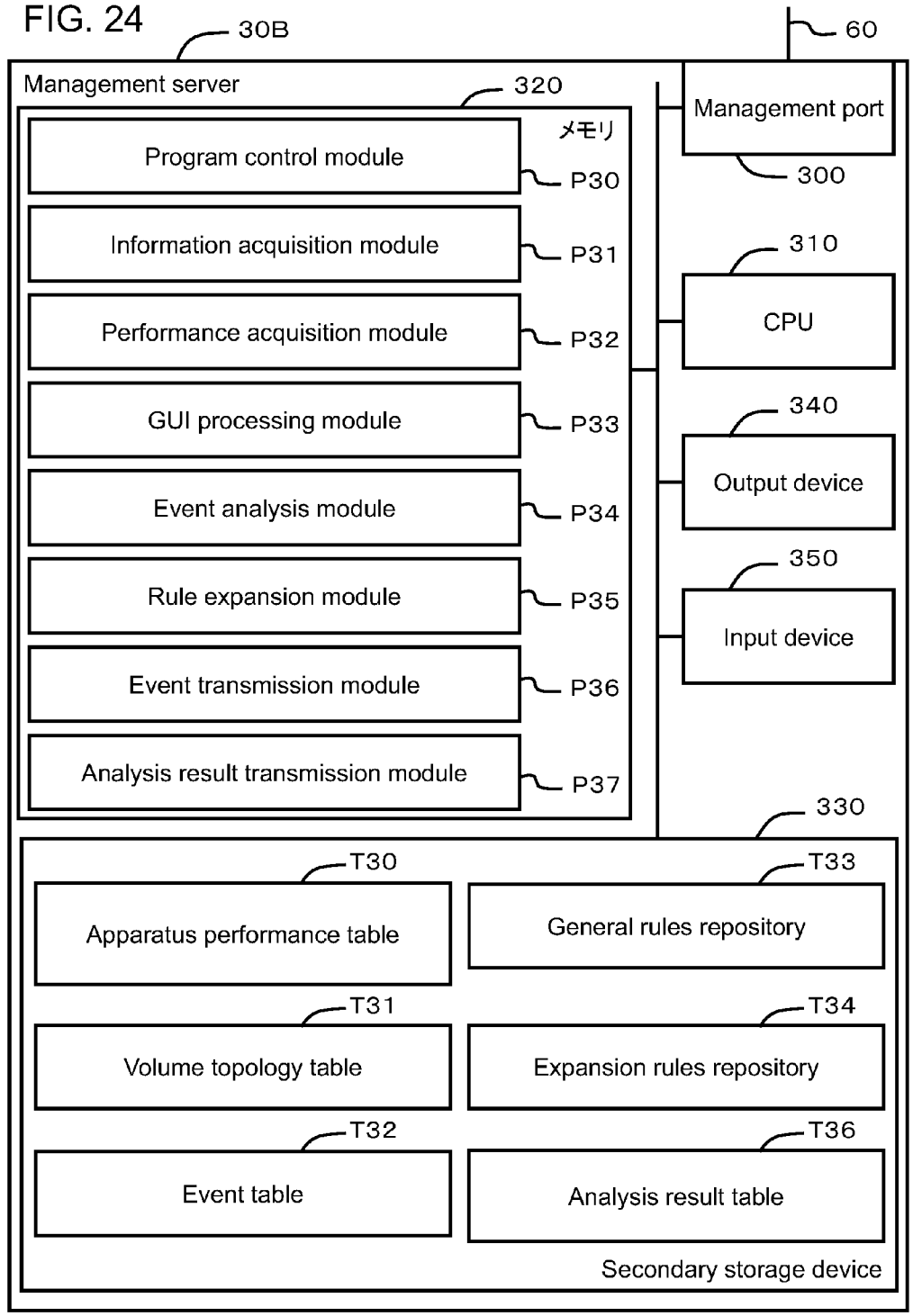
FIG. 24 is a diagram showing an example of the configuration of a management server.

FIG. 24 shows a detailed example of the internal configuration of the management server 30B.

Compared to the management server 30A described in the second embodiment, an analysis result transmission module P37 has been added to the management server 30B. The analysis result transmission module P37 transmits the cause of a problem that has been derived as an analysis result to the web server 50.

Because the above-mentioned points of difference are clear, the reference sign 30B, which differs from that of the management server 30A of the second embodiment, is used for the management server of this embodiment. However, since the basic configuration of the management server 30B is shared in common with that of the management server 30 of the first embodiment, the management server 30B will be called the management server 30 in the following explanation.

<Internal Configuration of Web Server>

Figure 25:
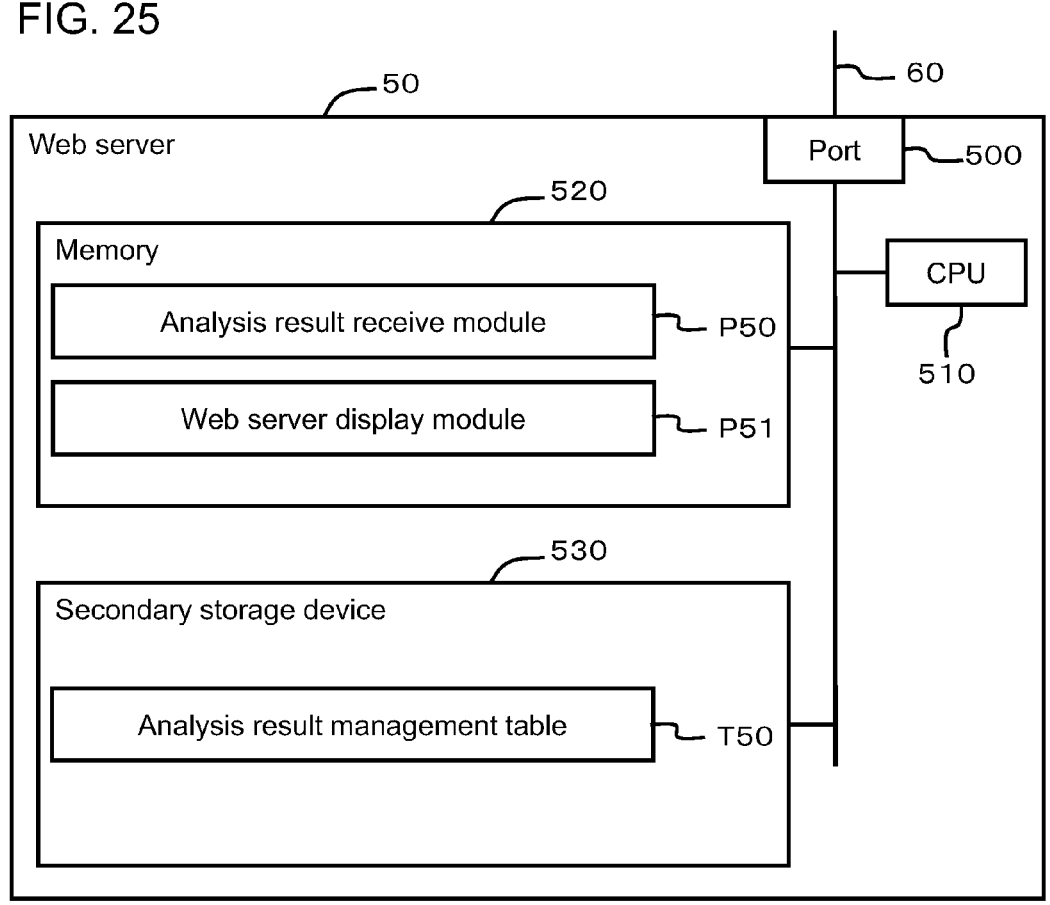
FIG. 25 is a diagram showing an example of the configuration of a web server.

FIG. 25 shows a detailed example of the internal configuration of the web server 50. The web server 50, for example, comprises a communication port 500, a processor 510, a memory 520, and a secondary storage device 530, and these components are coupled to one another via an internal bus or other such circuit.

The memory 520 stores an analysis result reception module P50, and a web browser display module P51. An analysis result management table T50 is stored in the secondary storage device 530. Furthermore, the secondary storage device 530 comprises either a semiconductor memory or a storage device, or both a semiconductor memory and a storage device.

A web client apparatus (not shown in the drawing) is connected to the web server 50 via the port 500 and the communication network 60. The web browser display module P51 displays the problem analysis result and so forth to the user via the web browser executed on the web client apparatus.

<Analysis Result Output Process>

The only process that differs between this embodiment and the second embodiment is the one for outputting the analysis result. In S89 of FIG. 22, the event analysis module P34 stores an expansion rule for which the certainty factor is not 0 from among the expansion rules inside the expansion rule repository in the analysis result management table T36. Thereafter, the event analysis module P34 sends the analysis result that was stored in the analysis result management table T36 to the web server 50 via the analysis result transmission module P37.

Figure 26:
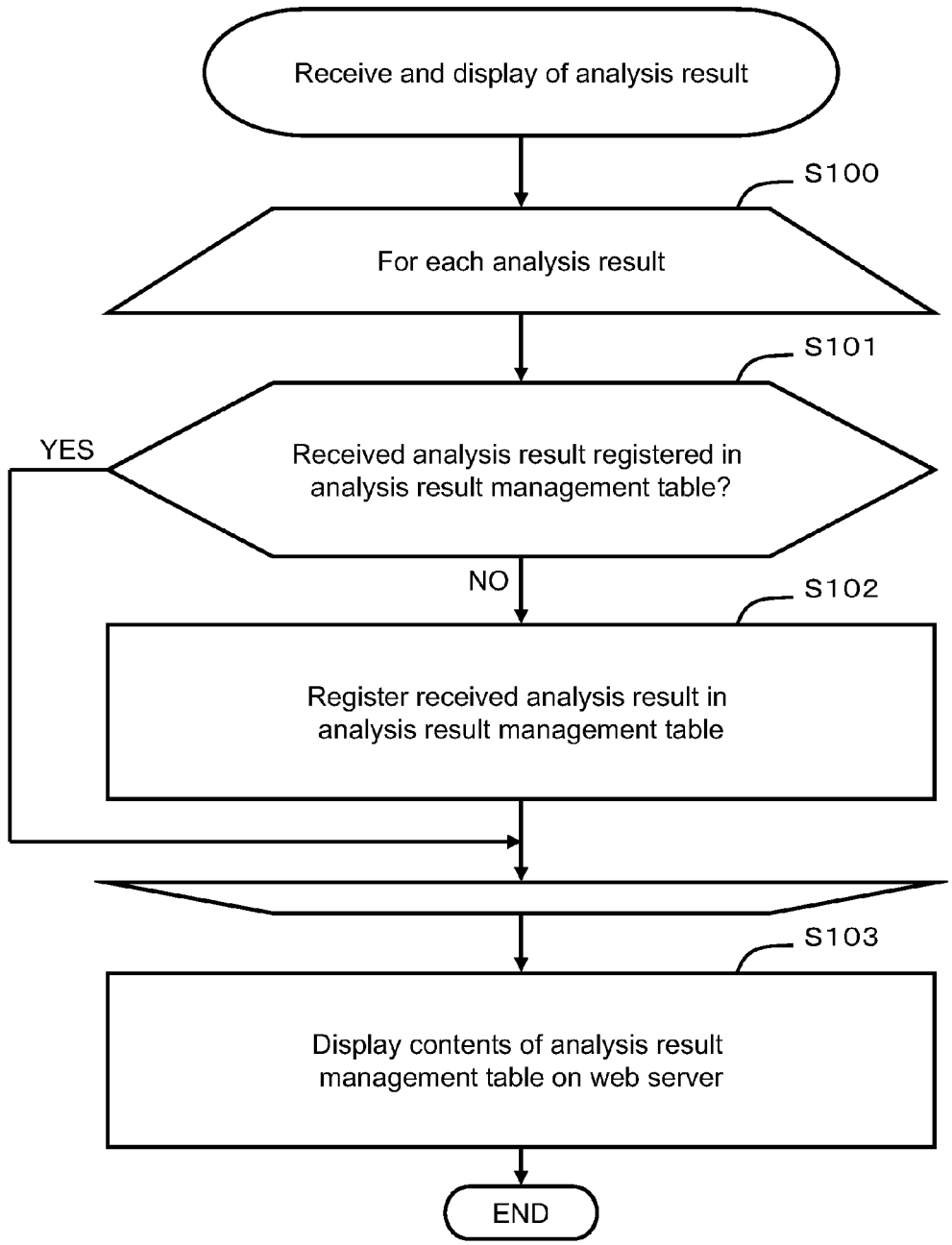
FIG. 26 is a flowchart showing an analysis results reception process and an analysis result output process.

The flowchart of FIG. 26 shows an analysis result receiving process and an analysis result output process carried out by the web browser 50. The analysis result reception module P50 is always on standby so as to be able to receive an analysis result sent from the analysis result transmission module P37 of the management server 30. The analysis result reception module P50 executes the processing of FIG. 26 at regular time intervals.

The analysis result reception module P50 executes the processing of S101 and S102 with respect to each analysis result received within a fixed time period (S100). The analysis result reception module P50 checks whether the received analysis result is already stored in the analysis result management table T50 (S101). In a case where the received analysis result is not stored in the analysis result management table T50 (S101: NO), the analysis result reception module P50 registers the received analysis result in the analysis result management table T50 in the web server 50 (S102).

After S101 and S102 have been executed with respect to all the analysis results received within the fixed time period, the web browser display module P51 displays the contents of the analysis result management table T50 on the web browser in accordance with a request from the web browser (S103).

FIG. 27 shows an example of the analysis result management table T50 after the analysis result has been registered. The analysis result management table T50, for example, comprises a cause apparatus ID C500, a cause component ID C501, a management server ID C502, a metric C503, a certainty factor C504, and a time of analysis C505.

The cause apparatus ID C500 stores the identifier of the apparatus, which has been determined to be the cause of the problem. The cause component ID C501 stores the identifier for identifying the location where the problem occurred inside the cause apparatus. The management server ID C502 stores the identifier of the management server that manages the apparatus, which was determined to be the cause of the problem. Since the other items C503, C504, and C505 are clear from their names, explanations will be omitted.

FIG. 28 shows an example of a screen G20 for displaying the problem analysis result. A problem cause table GP20 created on the basis of the analysis result management table T50 is displayed on the screen G20.

Configuring this embodiment like this also achieves the same effect as the second embodiment. In addition, in this embodiment, multiple management servers 30(1) and 30(2), which manage respectively different domains, are centrally managed using a single web server 50. Therefore, in this embodiment, a single user can manage the analysis results of a large-scale computer system comprising multiple management-target domains. This makes it possible to reduce the overall management costs of the computer system.

Example 4

A fourth embodiment will be explained by referring to FIGS. 29 through 32. In the respective embodiments described above, the management server 30 queries all the management servers detected on the network 60 to discover the external management server managing an apparatus, which does not reside inside its own management-target domain. These queries are made equally and uniformly. Therefore, in a large-scale computer system having a large number of management servers 30, the queries take time, thereby lowering management efficiency.

However, it is conceivable that a domain managed by a certain management server 30 will often be related to another domain within a certain limited range. That is, each management-target domain is not related to all the other management-target domains, but rather is only related to a part of the management-target domains thereamong.

This embodiment controls the range and order for querying other management servers based on what has been learned hereinabove. This embodiment, for example, controls the query order based on the status of a past query.

This embodiment will be explained by giving an example of a case in which this embodiment is applied to the second embodiment. As will be clearly understood by a person having ordinary skill in the art, this embodiment is also applicable to the first embodiment.

<Internal Configuration of Management Server>

Figure 29:
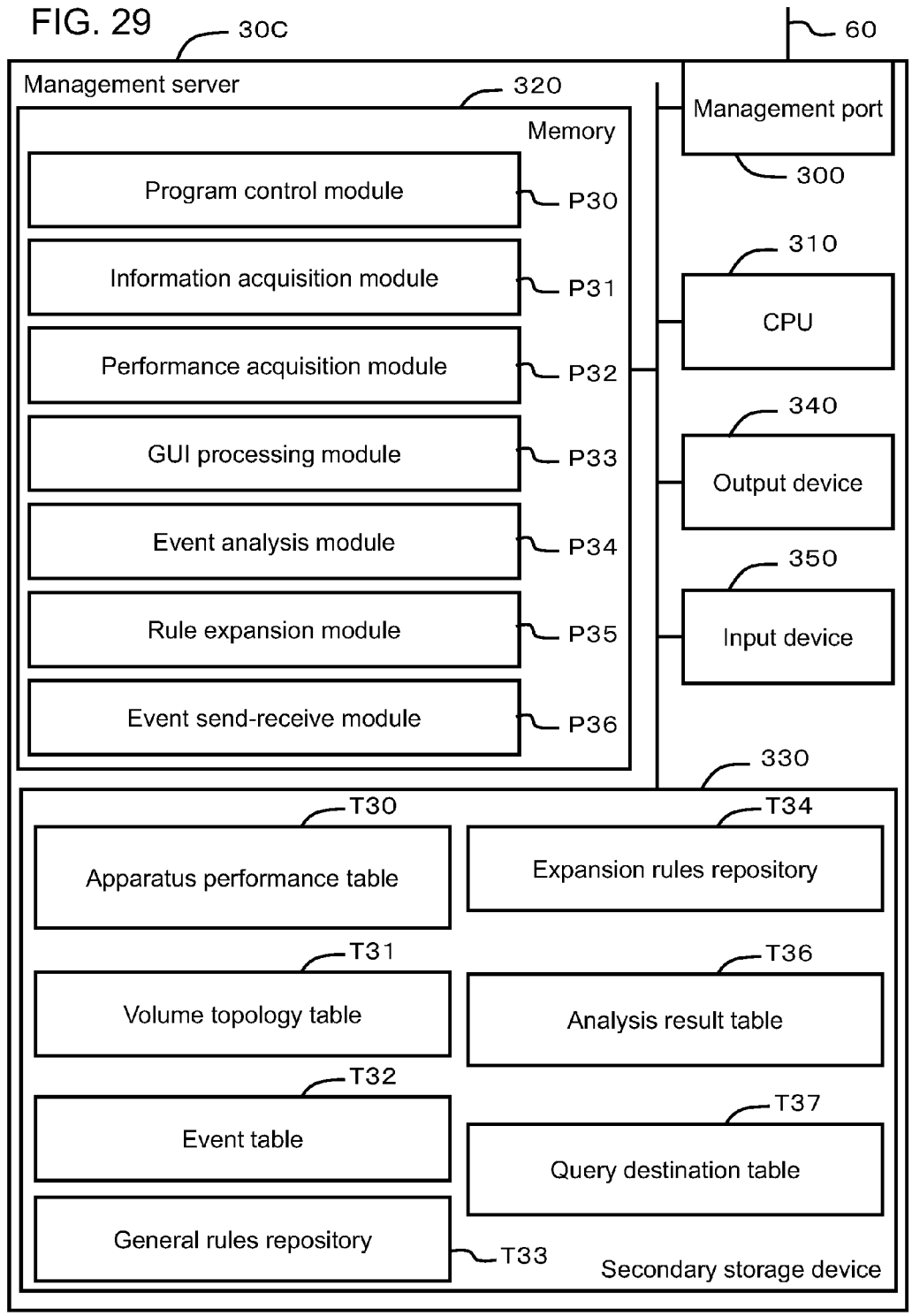
FIG. 29 is a diagram showing an example of the configuration of a management server in a fourth embodiment.

FIG. 29 shows a detailed example of the internal configuration of a management server 30C. Compared to the management server 30A of the second embodiment, the management server 30C of this embodiment comprises a query-destination server management table T37 (shortened to query-destination table in the drawing).

<Query-Destination Server Management Table Configuration>

FIG. 30 shows an example of the configuration of the query-destination server management table T37. The query-destination server management table T37, for example, comprises a management server ID C370, a redundancy C371, a number of servers in domain C372, a number of storages in domain C373, a number of switches in domain C374, and a date/time of last query C375.

The management server ID C370 stores the identifier of another management server (external management server), which has been queried previously. The redundancy C371 stores the redundancy. The redundancy is a value denoting whether a number of expansion rules of the expansion rules included in the expansion rule repository T34 are related to an apparatus inside another domain. The redundancy may also be called the extent of relationship.

The number of servers in domain C372 stores the number of host computers 10 belonging to the external domain being managed by the management server of C370. The number of storages in domain C373 stores the number of storage apparatuses 20 belonging to this external domain. The number of switches in domain C374 stores the number of switches 40 belonging to this external domain. The date/time of last query C375 stores the date and time when event information of the external domain was last used.

For example, look at the first row (the first entry) of FIG. 30. The management server has queried the external management server (SV2) about information related to the management-target domain of the external management server (SV2) in the past. The value of the redundancy C371 is "3", signifying that three of the expansion rules included in the expansion rule repository T34 of the management server 30 are related to the apparatus residing in the domain managed by the external management server (SV2). There are 100 host computers, 20 storage apparatuses, and 50 switches in the management-target domain of the external management server (SV2). The management server used information related to an apparatus under the management of the external management server (SV2) in a problem analysis carried out at "2010-01-01 15:10:00".

<Details of Problem Analysis Process>

Figure 31:
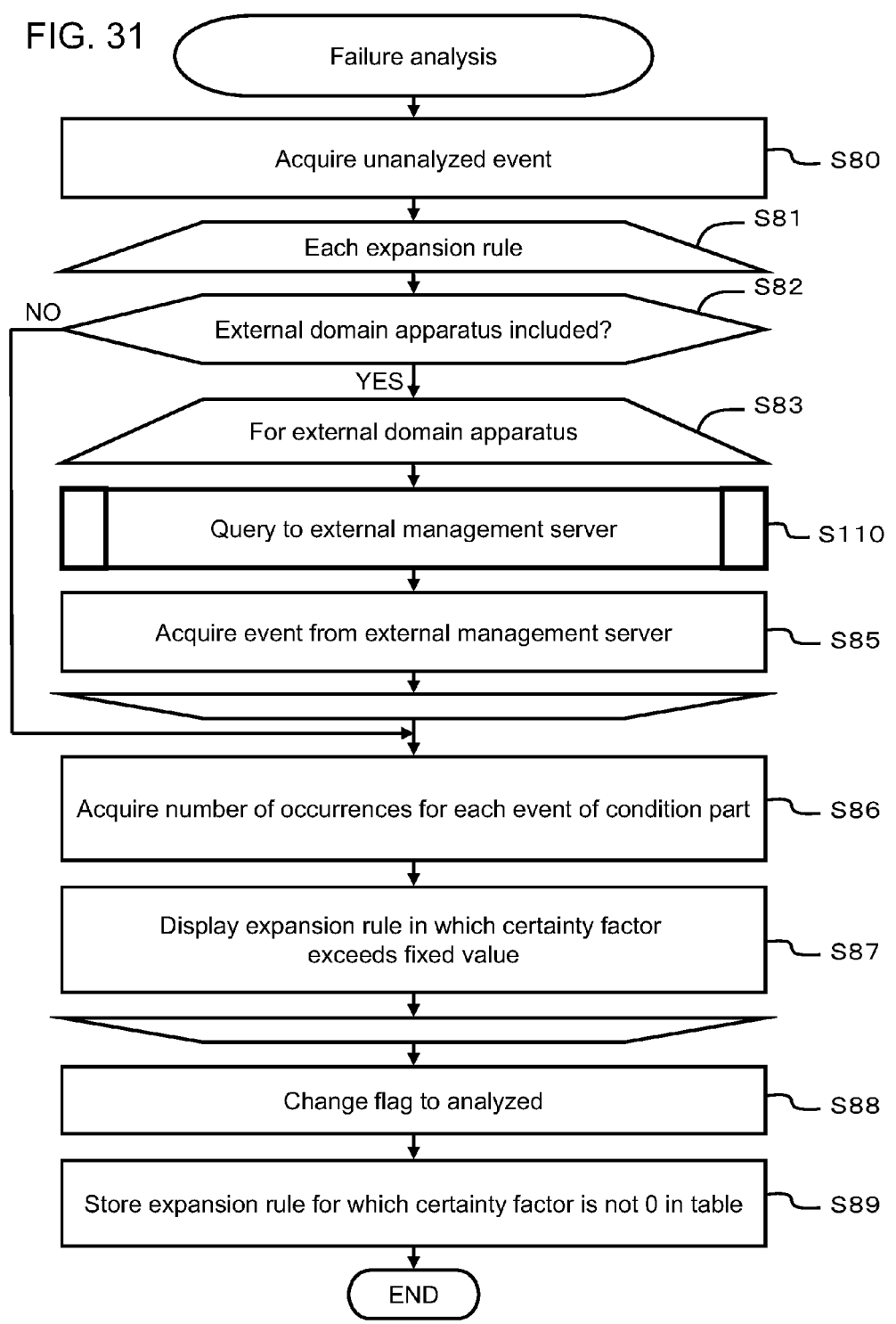
FIG. 31 is a flowchart showing a problem cause analysis process.

FIG. 31 is a flowchart showing a problem analysis process executed by the event analysis module P34. This process comprises steps S80 through S83, and S85 through S89, which are shared in common with the process shown in FIG. 22. This process comprises S110 instead of S84 shown in FIG. 22. Consequently, the explanation will focus on S110.

FIG. 32 is a flowchart showing the details of an external management server query process (S110 of FIG. 31) executed by the event analysis module P34.

The event analysis module P34 repeats the processing of S121 through S123 in order from the highest redundancy with respect to all the entries included in the query-destination management table T37 (S120).

The event analysis module P34 determines whether the type of apparatus targeted by the query is included in the domain managed by the target-entry external management server (S121). The event analysis module P34 determines S121 based on the contents of fields C372, C373, and C374 of the query-destination server management table T37.

In a case where the query-target type of apparatus is included in the management-target domain of the external management server (S121: YES), the event analysis module P34 queries this external management server about the apparatus ID (S122). In a case where the external management server does not manage the apparatus having this apparatus ID (S123: NO), the event analysis module P34 returns to S120 and moves to the next entry.

In a case where the query-target apparatus has not been discovered even after checking all the entries of the query-destination server management table T37, it is clear that this apparatus is managed by another management server that is not registered in the table T37.

Consequently, the event analysis module P34 repeats S125 and S126 with respect to another external management server, which is not registered in the query-destination server management table T37 (S124).

The event analysis module P34 queries the external management server that is not registered in the table T37 about the ID of a prescribed apparatus included in the expansion rule (S125). The event analysis module P34 determines whether or not this external management server manages the prescribed apparatus ID (S126).

In a case where the external management server does not manage the prescribed apparatus ID (S126: NO), the event analysis module P34 returns to S124, and executes S125 and S126 with respect to the next external management server.

In a case where the loop has ended with respect to all the external management servers that are not registered in the table T37, the event analysis module P34 is able to determine that the query-target apparatus does not exist within the range recognized by the management server 30. That is, it is learned that the query-target apparatus is not managed by any of the external management servers whose existence is known to the management server 30.

In a case where the prescribed apparatus ID is managed by one of the external management servers registered in the table T37 (S123: YES), the event analysis module P34 moves to S127. The event analysis module P34 also moves to S127 in a case where the prescribed apparatus ID is managed by any of the external management servers not registered in the table T37 (S126: YES).

The event analysis module P34 queries the external management server that manages the prescribed apparatus ID about the types and numbers of apparatuses being managed by this external management server (S127). The event analysis module P34 stores the response to this query in the query-destination server management table T37 (S128).

In a case where the apparatus comprising the prescribed apparatus ID has been discovered in the management-target domain of an external management server registered in the table T37 (S123: YES), the event analysis module P34 increments the redundancy of this relevant entry of the table T37 by one. The event analysis module P34 also updates the date/time of last query C375.

Furthermore, for convenience sake, FIG. 32 shows that S127 and S128 are executed in a case where either a determination of YES was made in S123 or a determination of YES was made in S126. However, in actuality, as will be described further below using FIG. 32B, the acquisition of information as to what apparatuses are being managed by the external management server and the updating of the query-destination server management table T37 can be executed either regularly or irregularly. That is, the information of the table T37 is updated either periodically or at a prescribed time separate from the query process.

A case in which the apparatus comprising the prescribed apparatus ID has been discovered in the management-target domain of an external management server that is not registered in the table T37 (S128: YES) will be explained. In this case, the event analysis module P34 adds one new entry to the query-destination server management table T37. The event analysis module P34 stores this new entry with the external management server ID and the result of the query of S127. In addition, the value of the redundancy C371 of this new entry is configured to "1". The date/time of last query C375 is also updated.

This embodiment, which is configured like this, queries the external management servers in order from the one having the highest redundancy when the cause of the problem is being analyzed. The redundancy is the value denoting how many expansion rules are related to apparatuses inside another domain. A domain managed by an external management server having a high redundancy value will be more closely related to the management-target domain of the management server 30, thereby increasing the likelihood that the query-target apparatus is included therein.

Consequently, this embodiment queries the external management servers in order from the one having the highest redundancy about the apparatus ID. This makes it possible to efficiently query in order from the most likely external management server.

Furthermore, this embodiment prepares a number of servers in domain field C372, a number of storages in domain field C373, and a number of switches in domain field C374 in the query-destination server management table T37. The event analysis module P34 of the management server 30 does not query the management server in charge of a management domain, which does not include the type of apparatus of the query-target apparatus. Therefore, this embodiment reduces the number of external management servers that are queried, thereby making querying more efficient.

Furthermore, the configuration may be such that the date/time of last query C375 is used to re-acquire the state (the number of servers, the number of storages, and the number of switches) of the domain being managed by the external management server for which a prescribed time has elapsed since the date/time of the last query.

This embodiment narrows the scope of querying first as to the order from the highest redundancy, and second as to whether or not an apparatus of the query-target type apparatus is included. Therefore, an external management server having the information required for problem analysis can be effectively discovered.

This embodiment shows either an example of a configuration for querying multiple external management servers in accordance with a priority of one sort or another, or an example of a configuration that uses some sort of criterion for focusing on a query-destination external management server from among multiple external management servers. Therefore, the configuration may be such that the query order of the external management servers is controlled and the query range selected using a method other than the method described above.

FIG. 32A is a flowchart showing a first variation of this embodiment. The differences between FIG. 32A and FIG. 32 are the fact that the steps (S121, S122, and S123) for determining whether or not a domain includes the query-target apparatus type of apparatus is not provided in FIG. 32A, and the fact that the step (S127) for querying about the type and number of apparatuses being managed by the external management server is not provided.

The first variation queries each management server as to the ID of the target-apparatus in order from the one having the highest redundancy. In the case of the first variation, the query-destination server management table T37 shown in FIG. 30 need only comprise the management server ID C370 and the redundancy C371, and does not need to comprise the columns C372, C373, C374 and C375, which manage the external management server summary. The query-destination external management server can be selected based solely on the redundancy obtained from the status of a past query as in the first variation.

In this embodiment, an explanation was given using the example of redundancy, which denotes the depth of the relationship between domains, as an example of a priority. The present invention is not limited to the above-mentioned redundancy, but rather makes it possible to also select a query-destination management server based on various types of indices or standpoints.

For example, the configuration may be such that the external management servers are queried in order from the most recent analysis date/time. In this case, for example, a new field for storing the analysis date/time may be disposed in the query-destination server management table T37. As used here, the analysis date/time, for example, can be defined as the last time (date/time) the problem was analyzed using the information from the query-destination management server (external management server).

In a case where a determination of YES was made in S123, the analysis date/time is updated. Similarly, the analysis date/time is also updated when a determination of YES was made in S126. A more recent problem analysis date/time can be considered to include the apparatus that is the cause of the problem. Therefore, it is possible to carry out querying in order from the most likely external management server.

FIG. 32B is a flowchart showing a second variation of this embodiment. The difference between FIG. 32B and FIG. 32 is the fact that in FIG. 32B the query-destination external management server is selected based on whether or not this external management server comprises an apparatus of the same type as the query-target apparatus. That is, in the second variation, the selection of the query destination (S120 of FIG. 32) is not carried out on the basis of the redundancy. In the second variation, S124 through S126 of FIG. 32 are not provided since the selection of the query-destination external management server is based on whether or not this external management server comprises an apparatus of the same type as the target apparatus regardless of the redundancy.

The event analysis module P34 repeats the processing of S131 through S133 with respect to all the management servers on the communication network (S130). Because S131, S132, and S133 correspond to S121, S122 and S123 of FIG. 32, explanations of these steps will be omitted. Furthermore, when the apparatus ID has been detected (S133: YES), this processing ends.

In the case of the second variation, the query-destination server management table T37 shown in FIG. 30 need only comprise the management server ID C370, and the columns C372, C373, C374 and C375 for managing the external management server summary; the redundancy C371 is not required.

The table update process can be executed either regularly or irregularly with respect to all of the external management servers on the network as a process that is separate from the process of querying the external management servers. Because S140 and S141 of the table update process are the same as S127 and S128 shown in FIG. 32, explanations of these steps will be omitted. Furthermore, the configuration may be such that the table update process is executed when executing S131. Or, as described hereinabove, the configuration may be such that the table update process is executed prior to and separately from the period during which S131 is executed.

Figure 32C:
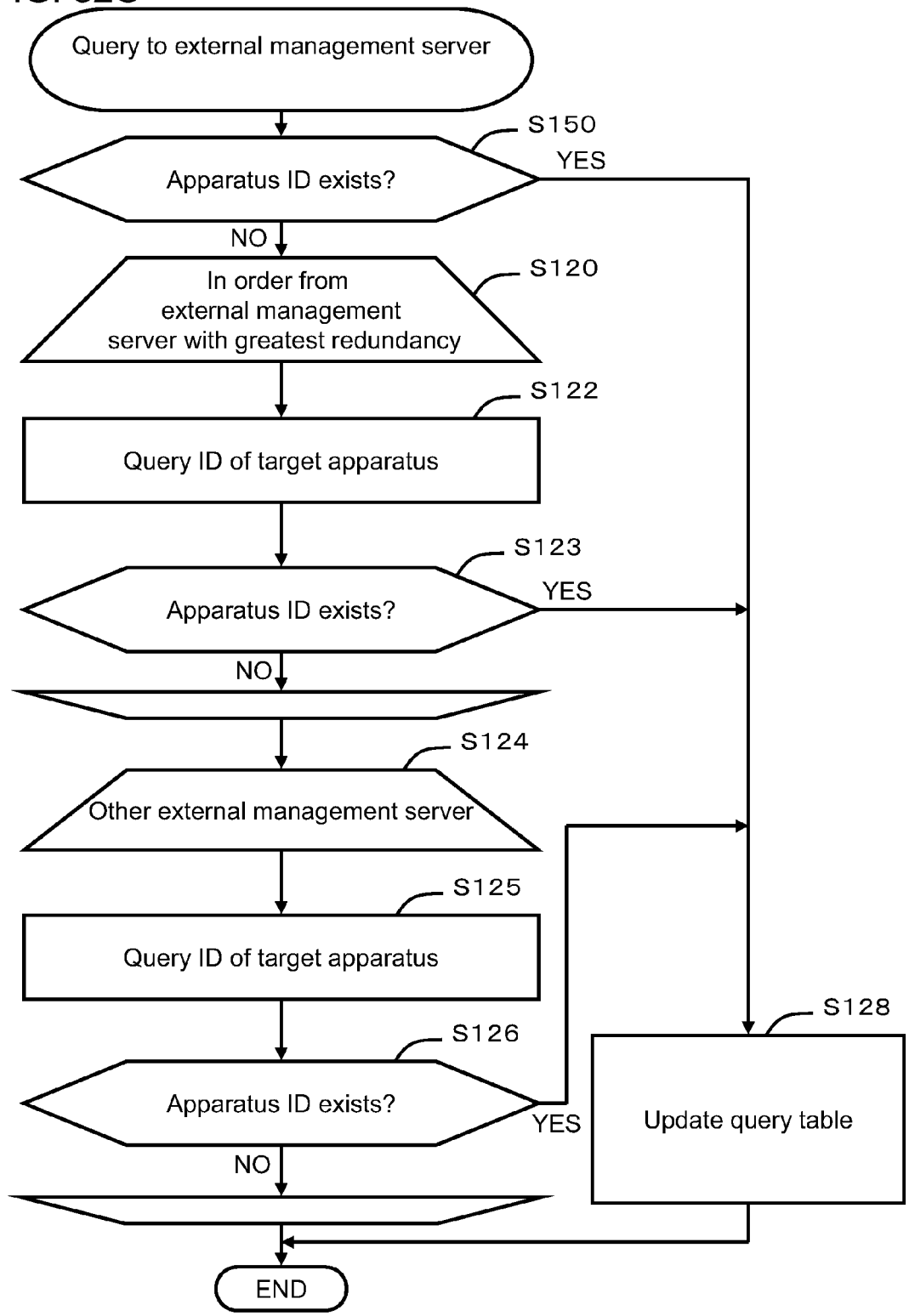
FIG. 32C is a flowchart showing an example of a third variation of the query process.

FIG. 32C is a flowchart showing a third variation of this embodiment. This process is premised on the first variation shown in FIG. 32A but is not limited thereto, and can also be applied to either the configuration of FIG. 32 or the configuration of FIG. 32B.

In FIG. 32C, first of all, the event analysis module P34 determines whether or not the ID of the target apparatus has been cached (S150). In a case where the target apparatus ID is cached (S150: YES), the event analysis module P34 moves to S128 and updates the query-destination server management table T37. The redundancy value is incremented by one at this point. Caching the target apparatus ID here signifies temporarily storing the target apparatus ID, which was sent in a response as the result of the query to the external management server, in the memory. The storage period can be configured using a variety of values. For example, the configuration may be such that the acquired target apparatus ID is stored only until the problem analysis query process is complete.

Alternatively, in a case where the target apparatus ID has not been cached (S150: NO), the event analysis module P34 executes S120 through S126 described hereinabove. In a case where a determination of YES was made in either S123 or S126, the event analysis module P34 updates the redundancy of the query-destination server management table T37 after caching this detected apparatus ID (S128).

According to the third variation, it is possible to reduce the number of queries because a query is not issued to an external management server regarding a cached target apparatus ID that has already been discovered. This makes it possible to complete the query process relatively quickly even when querying multiple external management servers about multiple apparatus IDs.

Example 5

Figure 33:
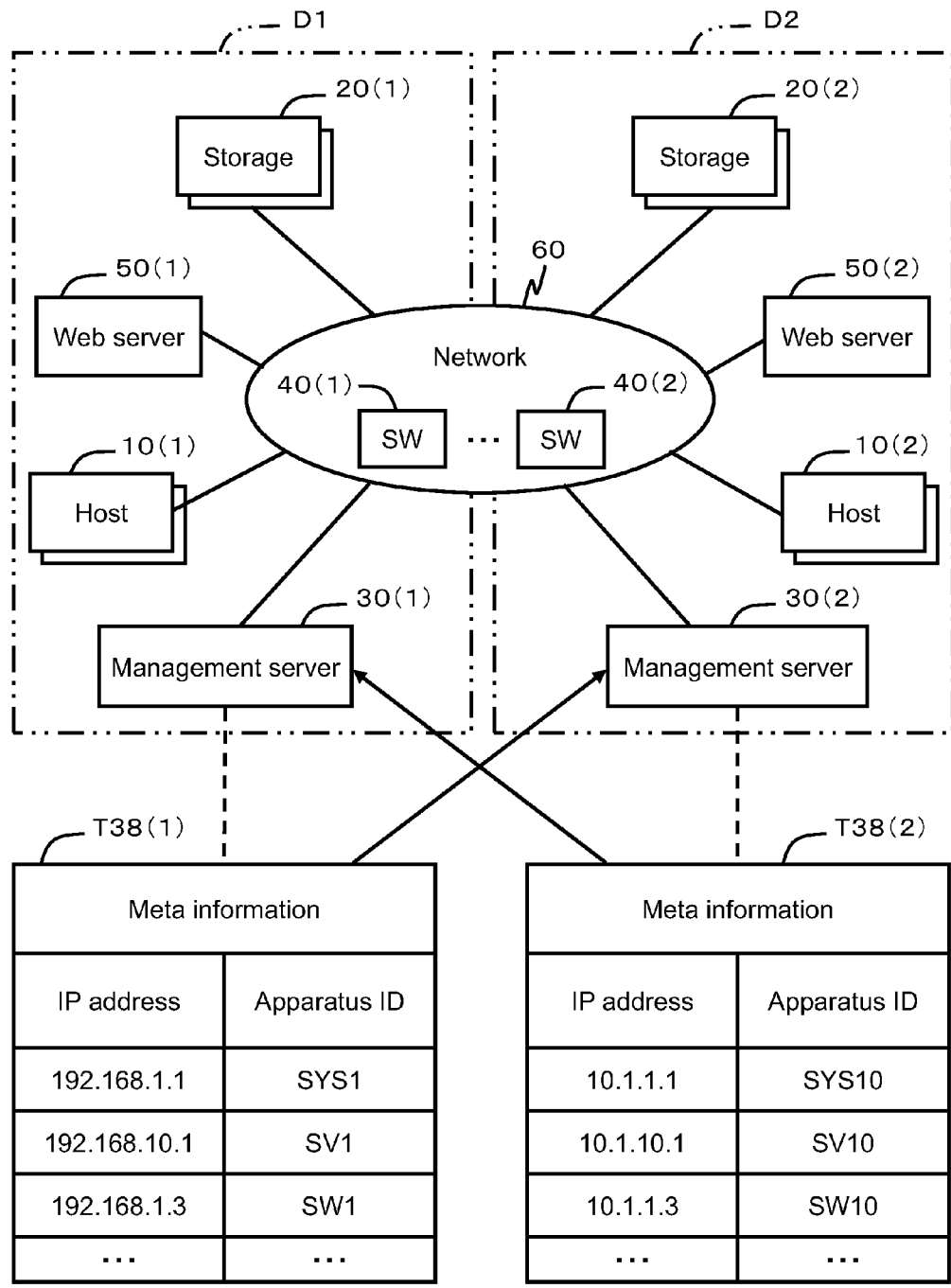
FIG. 33 is a flowchart showing a process for exchanging meta information related to a management-target apparatus among multiple management servers in a fifth embodiment.

A fifth embodiment will be explained by referring to FIGS. 33 and 34. In this embodiment, the respective management servers 30(1) and 30(2) share beforehand meta information T38 related to the apparatuses being managed by both of these management servers.

The management server 30(1) comprises meta information T38(1) related to the hosts 10(1) and the storage apparatuses 20(1) included in the management domain D1 thereof. The meta information T38(1), for example, is stored in the secondary storage device 330 of the management server 30(1).

The meta information T38(1), for example, correspondingly manages the IP address and the apparatus ID of each apparatus. Information other than this need not be included in the meta information T38(1).

Similarly, the management server 30(2) also comprises meta information T38(2) related to the hosts 10(2) and the storage apparatuses 20(2) included in the management domain D2 thereof. The meta information T38(2) is comprised the same as the meta information T38(1), and therefore an explanation will be omitted.

The management server 30(1) and the management server 30(2) exchange the respective meta information regularly. The meta information T38(1) is sent from the management server 30(1) to the management server 30(2). The meta information T38(2) is sent from the management server 30(2) to the management server 30(1). This makes it possible for the management server 30(1) and the management server 30(2) to know the IP addresses and apparatus IDs of the apparatuses they are respectively managing in advance.

In this embodiment, the respective management servers are able to immediately discern which management server is managing an apparatus required for cause analysis by simply referring to the meta information T38 when analyzing the cause of the problem.

Figure 34:
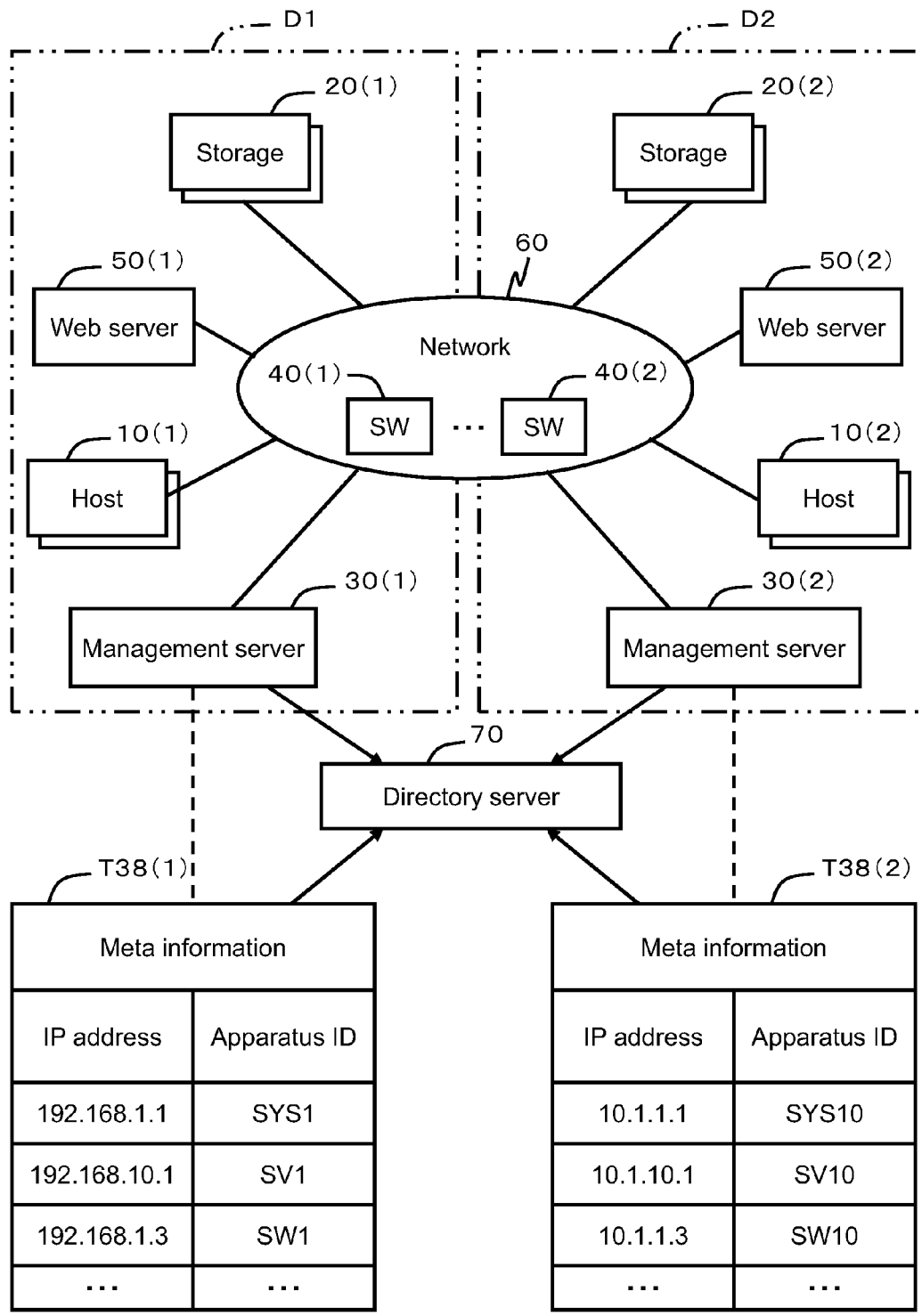
FIG. 34 is a flowchart showing a process for using a directory server to exchange meta information related to a management-target apparatus among multiple management servers.

FIG. 34 shows a variation of this embodiment. In FIG. 33, a configuration in which the meta information T38 is shared by exchanging messages between the respective management servers was explained. In the variation of FIG. 34, a directory server 70 is provided, the respective management servers 30(1) and 30(2) are coupled to the directory server 70, and the directory server 70 manages the respective meta information T38(1) and T38(2).

The respective management servers 30(1) and 30(2) update the meta information T38(1) and T38(2) inside the directory server 70 either at regular intervals or when the configuration of the management-target domain has been changed.

Furthermore, only one directory server 70 is shown in FIG. 34, but the configuration may be such as to comprise multiple directory servers. For example, a distributed database system such as a DNS (Domain Name System) may be used, and the information may be distributively managed in prescribed configuration units.

Even configuring this embodiment like this makes it possible to manage the computer system using multiple management servers. In addition, in this embodiment, the respective management servers share the meta information related to their respective management-target domains, and as such, there is no need for a query process when the management servers are analyzing a problem. Therefore, it is possible to enhance processing efficiency at problem analysis time.

Furthermore, the present invention can also be realized using the program code of software that realizes the functions of the embodiments. In accordance with this, a storage medium on which the program code is recorded is provided to the system or apparatus. The computer (or CPU or MPU) of this system or apparatus reads the program code stored on the storage medium. In accordance with this, the program code itself, which has been read from the storage medium, realizes the functions of the embodiments described hereinabove. As the storage medium, for example, a flexible disk, a CD-ROM, a DVD-ROM, a hard disk, an optical disk, an optical storage device, a CD-R, a magnetic tape, a nonvolatile memory card, or a ROM can be used.

An OS (operating system) or the like running on the computer may perform either all or a part of the actual processing based on the program code instructions, and the functions of the above-described embodiments may be realized in accordance with this processing.

After the program code read from the storage medium has been written to a memory on the computer, the computer CPU or the like may perform either all or a part of the actual processing based on the program code instructions, and the functions of the above-described embodiments may be realized in accordance with this processing.

The program code may be stored on either storage means, such as either a system or apparatus memory, or on a storage medium such as a CD-RW, CD-R, or the like in accordance with delivering the software program code for realizing the functions of the embodiments via the network. In accordance with this, the computer (or CPU or MPU) of either this system or apparatus may read and execute the program code stored in the storage means or storage medium.

These embodiments, for example, can be expressed as a computer program as follows:

"A computer program, which causes a computer to function as a management apparatus for managing a computer system, wherein multiple management domains are configured in the computer system, the multiple management domains respectively comprise at least one node apparatus and a management apparatus for managing the node apparatus, the respective management apparatuses store a prescribed analysis rule, the prescribed analysis rule defines a relationship between a causal event, which constitutes a cause of a problem, and multiple relevant events, which denote problems created by the causal event, and the computer program acquires, from among the respective relevant events, a relevant event related to a prescribed node apparatus, which is not under management of the management apparatus, from another management apparatus, which manages the prescribed node apparatus, and analyzes a problem by applying the relevant event acquired from the other management apparatus and another relevant event related to a node apparatus under the management of the management apparatus to the analysis rule."

The third embodiment can be applied to any of the first embodiment, the second embodiment, the fourth embodiment and the fifth embodiment. The fourth embodiment can be applied to any of the first embodiment, the second embodiment, and the third embodiment.

These embodiments, for example, can be expressed as follows:

"A computer system management method comprising a first management apparatus:

querying only a management apparatus, which is managing a node apparatus of a same type as the prescribed node apparatus, as to whether or not this management apparatus is managing the prescribed node apparatus; and acquiring a relevant event related to the prescribed node apparatus from the second management apparatus in a case where the second management apparatus has responded that the second management apparatus is managing the node apparatus."

In addition, the third variation of the fourth embodiment can be expressed as follows:

"A computer system management method comprising a first management apparatus:

storing (caching) a result of a query as to whether or not the prescribed node apparatus is being managed;

querying the respective management apparatuses with respect to a prescribed node apparatus, which is not stored in the query result; and not querying the respective management apparatuses with respect to a prescribed node apparatus, which is stored in the query result."

REFERENCE SIGNS LIST

10 Host computer
20 Storage apparatus
30 Management server
40 IP switch
50 Web server
60 Communication network

The invention claimed is:

1. A method for managing a computer system, wherein multiple management domains are configured in the computer system,
the multiple management domains respectively comprise at least one node apparatus and a management apparatus for managing the node apparatus,
the respective management apparatuses are configured to store a prescribed analysis rule, and
the prescribed analysis rule defines a relationship between a causal event, which constitutes a cause of a problem, and multiple relevant events, which denote problems created by the causal event,
the method comprising:
acquiring, using a first management apparatus of the respective management apparatuses, from among the respective relevant events, a relevant event related to a prescribed node apparatus, which is not under management of the first management apparatus, from a second management apparatus, which is configured to manage the prescribed node apparatus from among the respective management apparatuses,
analyzing, using the first management apparatus, a problem by applying the relevant event acquired from the second management apparatus and another relevant event related to a node apparatus under the management of the first management apparatus to the analysis rule,
querying, using the first management apparatus, the second management apparatus as to whether or not the second management apparatus is managing the prescribed node apparatus, and
acquiring, using the first management apparatus, the relevant event related to the prescribed node apparatus from the second management apparatus in a case where the second management apparatus has responded that the second management apparatus is managing the prescribed node apparatus.

2. A computer system management method according to claim 1, further comprising:
computing, using the first management apparatus, a likelihood of the causal event on a basis of the number of the acquired relevant events of the multiple relevant events included in the analysis rule, and outputs the likelihood of the causal event as a part of a problem analysis result.

3. A computer system management method according to claim 2, further comprising:
in a case where a node apparatus related to the causal event is being managed by the second management apparatus, associating, using the first management apparatus, information denoting the second management apparatus with the causal event, and outputting, using the first management apparatus, this associated information as a part of the problem analysis result.

4. A computer system management method according to claim 1, further comprising:
selecting, using the first management apparatus, from among the respective management apparatuses in order of prescribed priority, a management apparatus for querying as to whether or not this management apparatus is managing the prescribed node apparatus as a query-destination management apparatus.

5. A computer management method according to claim 4, wherein the prescribed priority is configured based on a degree of association between a management domain managed by the first management apparatus and a management domain managed by another management apparatus.

6. A computer system management method according to claim 5, further comprising:
checking, using the first management apparatus, whether or not the query-destination management apparatus is managing a node apparatus of a same type as the prescribed node apparatus, and querying, using the first management apparatus, the query-destination management apparatus as to whether or not the query-destination management apparatus is managing the prescribed node apparatus only in a case where the query-destination management apparatus is managing the node apparatus of the same type as the prescribed node apparatus.

7. A computer system management method according to claim 6, further comprising:
making, using the first management apparatus, a reservation beforehand in the second management apparatus for transfer of the relevant event to the first management apparatus in a case where a problem related to the relevant event has occurred in the prescribed node apparatus.

8. A computer system management method according to claim 7, wherein
there is provided an analysis result display apparatus configured to acquire and display problem analysis results from the respective management apparatuses, and
the method further comprises:
displaying, using the analysis result display apparatus, the respective problem analysis results exclusive of a duplicate problem analysis result from among the respective problem analysis results received from the respective management apparatuses.

9. A computer system management method according to claim 1, further comprising:

acquiring, using the first management apparatus, from the second management apparatus the relevant event related to the prescribed node apparatus in a case where at least one of the respective relevant events has been detected in a node apparatus under the management of the first management apparatus.

10. A computer system management method according to claim 9, further comprising:

selecting, using the first management apparatus, from among the respective management apparatuses in order of prescribed priority, a management apparatus for querying as to whether or not this management apparatus is managing the prescribed node apparatus as a query-destination management apparatus.

11. A computer system management method according to claim 1, further comprising:

storing, using the respective management apparatuses, node management information related to the node apparatuses under management thereof, and at a prescribed time, exchanging, using the respective management apparatuses, node management information with one another.

12. A computer system management method according to claim 11, wherein there is provided a node management information storage part configured to store the respective node management information, and accessing, using the respective management apparatuses, the node management information storage part and using, by the respective management apparatuses, desired node management information from among the respective node management information.

13. A computer system management apparatus, which is configured to manage any one management domain of multiple management domains configured in a computer system, wherein the management apparatus is configured to store a prescribed analysis rule, the prescribed analysis rule defines a relationship between a causal event, which constitutes a cause of a problem, and multiple relevant events, which denote problems created by the causal event, and the management apparatus is configured to acquire, from among the relevant events, a relevant event related to a prescribed node apparatus, which is not under management of its own apparatus, from another management apparatus, which is configured to manage the prescribed node apparatus, and analyze a problem by applying the relevant event acquired from the other management apparatus and another relevant event related to a node apparatus under the management of its own management apparatus to the analysis rule, query the other management apparatus as to whether or not the other management apparatus is managing the prescribed node apparatus, and acquire the relevant event related to the prescribed node apparatus from the second management apparatus in a case where the other management apparatus has responded that the other management apparatus is managing the prescribed node apparatus.

* * * * *